(12) United States Patent
Lee et al.

(10) Patent No.: US 7,661,862 B2
(45) Date of Patent: Feb. 16, 2010

(54) LCD DISPLAY BACKLIGHT USING ELONGATED ILLUMINATORS

(75) Inventors: Junwon Lee, Webster, NY (US); Marek W. Kowarz, Henrietta, NY (US); Peter T. Aylward, Hilton, NY (US); Qi Hong, Rochester, NY (US); Randall H. Wilson, Albuquerque, NM (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 284 days.

(21) Appl. No.: 11/677,591

(22) Filed: Feb. 22, 2007

(65) Prior Publication Data

US 2008/0137328 A1    Jun. 12, 2008

Related U.S. Application Data

(60) Provisional application No. 60/873,318, filed on Dec. 7, 2006.

(51) Int. Cl.
*F21V 5/00* (2006.01)
*G09F 13/08* (2006.01)

(52) U.S. Cl. ............... 362/559; 362/555; 362/97.1; 362/330

(58) Field of Classification Search ............ 362/330, 362/551, 554–556, 559–561, 97.1; 349/61–64
See application file for complete search history.

(56) References Cited

U.S. PATENT DOCUMENTS

| | | | |
|---|---|---|---|
| 5,400,224 A | 3/1995 | DuNah et al. | |
| 5,499,112 A | 3/1996 | Kawai et al. | |
| 5,542,016 A | 7/1996 | Kaschke | |
| 5,835,661 A | 11/1998 | Tai et al. | |
| 5,857,761 A | 1/1999 | Abe et al. | |
| 6,714,185 B2 * | 3/2004 | Kim et al. | 345/102 |
| 6,789,921 B1 | 9/2004 | Deloy et al. | |
| 7,165,856 B2 * | 1/2007 | Tseng et al. | 362/26 |
| 7,229,199 B2 * | 6/2007 | Lee et al. | 362/561 |
| 2002/0131275 A1 * | 9/2002 | Yamamoto et al. | 362/555 |
| 2003/0123246 A1 | 7/2003 | Parker | |
| 2003/0123261 A1 * | 7/2003 | Muthu et al. | 362/555 |
| 2005/0231973 A1 | 10/2005 | Cassarly et al. | |
| 2007/0274093 A1 * | 11/2007 | Haim et al. | 362/561 |

OTHER PUBLICATIONS

M. Zeiler, et al., "Late-News Paper: Optimization Parameters for LED Backlighting Solutions" SID, 2006 Digest, pp. 1524-1527.

* cited by examiner

*Primary Examiner*—Bao Q Truong
(74) *Attorney, Agent, or Firm*—Edwin Oh

(57) ABSTRACT

A backlight apparatus for directing light toward a display panel and the resulting display device comprises an elongated illuminator that is disposed to direct light towards the display panel and a light diffusing element for uniformizing the light redirected from the two or more elongated illuminators to provide backlight illumination. Such an apparatus provides a more even light distribution to the display.

36 Claims, 22 Drawing Sheets

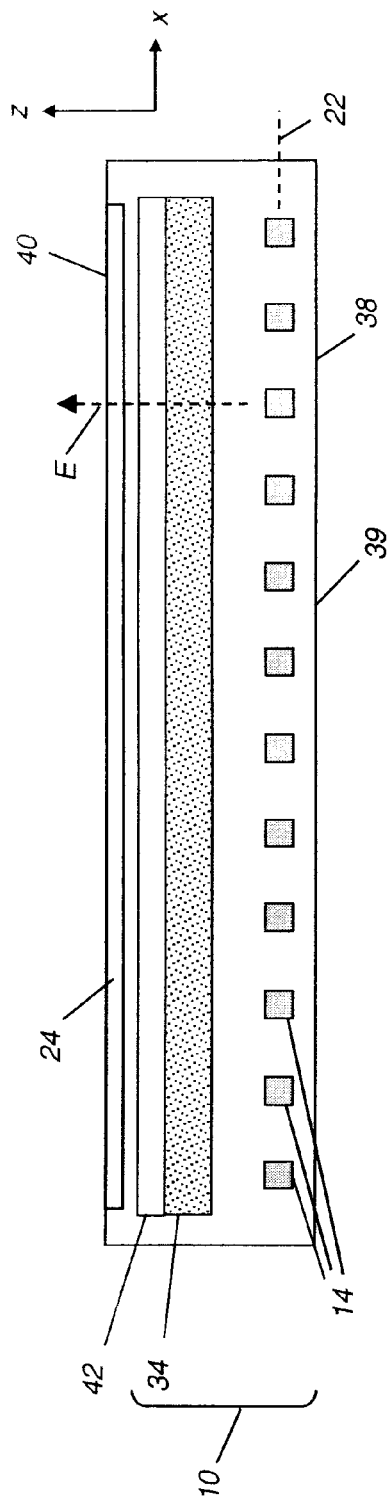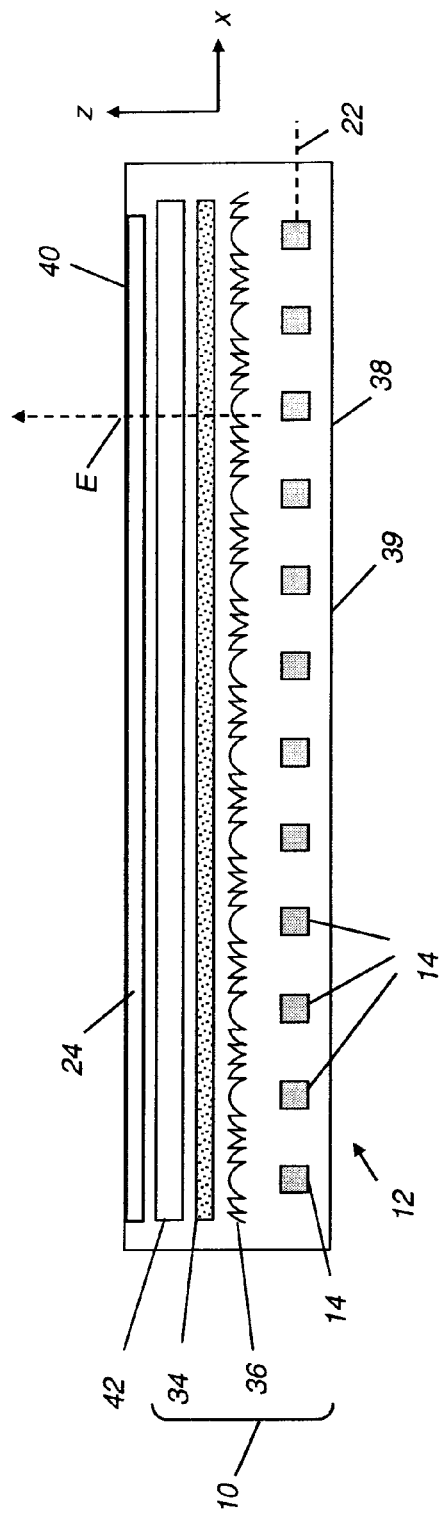

LCD DISPLAY BACKLIGHT USING ELONGATED ILLUMINATORS

CROSS REFERENCE TO RELATED APPLICATION

Reference is made to and priority claimed from U.S. Provisional Application Ser. No. 60/873,318 filed Dec. 7, 2006, entitled LINEAR ILLUMINATION ELEMENT AND PROCESS.

FIELD OF THE INVENTION

This invention relates to the art of backlight apparatus for a display and a liquid crystal display employing such apparatus. In particular, the present invention relates to a Liquid Crystal Display (LCD) backlight with solid-state light sources.

BACKGROUND OF THE INVENTION

While liquid crystal displays (LCDs) offer a compact, lightweight alternative to cathode ray tube (CRT) monitors, there are many applications for which the image quality of LCD displays are not yet satisfactory, particularly as the relative size of these devices increases. Larger LCD panels, such as those used in laptop computer or larger displays, are transmissive, and thus require a backlight. This type of light-providing surface, positioned behind the LCD panel, directs light outwards and towards the LCD.

Conventional approaches for backlighting use various arrangements of cold cathode fluorescent (CCFL) light sources with light guide plates, one or more types of enhancement films, polarization films, reflective surfaces, and other light conditioning elements. Conventional flat panel backlight solutions using side-mounted CCFLs are less and less desirable as display size increases and, particularly as display area grows, can be susceptible to warping in manufacture or due to heat. Light-guiding backlight techniques that are conventionally employed for smaller devices are increasingly hampered by low brightness or luminance levels and by problems related to poor uniformity as the display size increases, such as would be needed for digital TV, for example. Existing backlight apparatus for LCD displays and other display and illumination applications, often using banks of CCFLs lined up in parallel, can be relatively inefficient. These display solutions can also be relatively thick, due to the need to house the CCFL and its supporting films and surfaces behind the LC panel. The CCFL light source itself presents an environmental problem for disposal, since these devices contain some amount of mercury. To compensate for uniformity and brightness problems with conventional CCFL-based backlights, a number of supporting films are conventionally interposed between the backlight and the display, or disposed following the display, such as relatively high-cost reflective polarization films for example. As is well known, the spectral characteristics of CCFLs are relatively poor when compared to other types of light sources.

Faced with the inherent difficulties and limitations to CCFL used in backlighting applications, researchers have been motivated to pursue alternative backlighting approaches. A number of solutions have been proposed utilizing Light-Emitting Diodes (LEDs). Recent advances in LED brightness, color output, and overall performance, with continuing reduction in cost, make LEDs, lasers, and solid-state light sources in general particularly attractive. However, because LEDs and lasers act as point light sources, appropriate solutions are needed for redirecting and spreading this light to provide the uniform plane of light that is needed for backlighting and to provide the necessary color uniformity.

One approach for providing backlight illumination using LEDs is using an array arrangement, such as that described in the paper by M. Zeiler, J. Huttner, L. Plotz, and H. Ott entitled "Late-News Paper: Optimization Parameters for LED Backlighting Solutions" SID 2006 Digest pp. 1524-1527. Using this type of solution, an array of LED clusters using Red (R), Green (G), and Blue (B) LEDs is deployed as a backlight for an LCD displays. Two types of clusters are described: RGGB and RGB. Similarly, U.S. Pat. No. 6,789,921 entitled "Method and Apparatus for Backlighting a Dual Mode Liquid Crystal Display" to Deloy et al. describes an array arrangement used for an instrument panel. However, except for specialized uses such as for some types of instrument panels and for very high-end monitors and TV panels, array arrangements do not appear promising, due to problems of poor color and brightness uniformity, high parts count, high heat, and dimensional requirements.

Light guides have been employed for spreading light from a point source in order to form a line of light. For example, U.S. Pat. No. 5,499,112 entitled "Light Guide, Illuminating Device Having the Light Guide, and Image Reading Device and Information Processing Apparatus Having the Illuminating Device" to Kawai et al. discloses redirecting light from one or more LEDs to a line in a scanning apparatus, using a single light guide having extraction features distributed along its length. U.S. Pat. No. 5,400,224 entitled "Lighting Panel" to DuNah et al. describes a molded panel assembly having multiple light guides that are treated with randomized roughness over a back surface for backlighting illumination.

A number of solutions have been proposed for redistributing LED light over a larger area, along a light guiding panel. One proposed solution is the MicroLens™ molded light guide from Global Lighting Technologies Inc., Brecksville, Ohio that spreads light from a single LED over a larger light panel. Similarly, U.S. Patent Application Publication No. 2003/0123246 entitled "Light Emitting Panel Assemblies" by Parker shows a small-scale light panel using multiple point sources with optical "deformities" that redirect light into the panel.

Another type of solution first directs the light from the LED, lamp, or other point source along a line, then spread this light over a panel. For example, U.S. Pat. No. 5,835,661 entitled "Light Expanding System for Producing a Linear or Planar Light Beam from a Point-Like Light Source" to Tai et al. describes a beam-expanding light pipe that directs a line of light to a light panel for distribution over an area. Similarly, the luminaire arrangement described in U.S. Patent Application No. 2005/0231973 entitled "Efficient Luminaire with Directional Side-Light Extraction" by Cassarly et al. uses a light pipe with a light extraction structure for redirecting light along a backplane, such as for an exhibit or display case. As yet another example of this approach, U.S. Pat. No. 5,857,761 entitled "Illumination Device" to Abe et al. describes a light guide that spreads point source light into a light radiation plate.

Still other backlighting solutions employ flexible optical fibers for directing light from a single light source, then treated for spreading the light for emission behind an LCD panel. Different versions of this approach are described, for example, in U.S. Pat. No. 6,714,185 entitled "Back Lighting Apparatus of Liquid Crystal Display Using Optical Fiber" to Kim et al. and in U.S. Pat. No. 5,542,016 entitled "Optical Fiber Light Emitting Apparatus" to Kaschke.

As the above-cited examples attest, there has been considerable work directed to the goal of providing LED backlighting. However, although there have been a number of solutions proposed, there are significant drawbacks inherent to each type of solution, particularly when faced with the problem of backlighting for a display panel of standard laptop dimensions or larger. The 2-D matrix proposed in the '921 Deloy et al. disclosure would be difficult to implement inexpensively, of relatively high cost, bulky, and prone to uniformity problems. The light guide arrangement described in the '112 Kawai et al. disclosure is optimized for scanning applications that require a uniform line of light, rather than display backlighting applications. The molded panel arrangement described in the '224 DuNah et al. disclosure may work well enough for general illumination, but would be prone to uniformity problems for full-color display applications. This type of solution is increasingly expensive to manufacture in larger sizes and is subject to warping due to heat and mechanical stress. More importantly, such a solution does not provide good color mixing and would not be well suited to applications using solid-state light sources. Point source-to-panel configurations such as those described in the '3246 Parker application are impractical and exhibit uniformity problems for color and brightness for larger-sized displays. Light-guide-to-back-panel arrangements such as those described in the '661 Tai et al. disclosure are inefficient, are subject to poor uniformity, and are suitable only for relatively small displays. The use of treated optical fibers has advantages for small-scale handheld displays but would be impractical and inefficient for desktop or larger display designs.

In addition to these drawbacks, conventional solutions generally fail to address important challenges for high-quality color imaging, required for widespread commercialization and acceptance of LC displays. Color gamut is one important consideration that is of particular interest to display designers. Conventional CCFLs provide a measure of color quality that is acceptable for many applications, offering up to about 70% of the NTSC color gamut. Although this may be acceptable for laptop and computer monitor applications, it falls short of what is needed for full-color TV displays.

In contrast to CCFL light sources, LEDs and other solid-state light sources, because of their relatively high degree of spectral purity, are inherently capable of providing 100% or more of the NTSC color gamut. In order to provide this enlarged color gamut, three or more different-colored LEDs or other solid-state sources are needed. To support such an expanded color gamut when using LEDs and other solid-state light sources, a high level of color mixing is required from the backlighting apparatus. As is well known to those skilled in the imaging display art, achieving a good level of color uniformity when using solid-state light sources, such as Red (R), Green (G), and Blue (B) LEDs, is particularly challenging. Conventional backlighting solutions that employ larger-area light guides, such as those described above, would provide correspondingly inferior color mixing.

Other challenges related to backlighting for larger scale displays include the need for low-cost assembly, light efficiency, uniformity, and compact size. As noted earlier, conventional LED backlighting solutions fall short of what is needed to meet these additional requirements. Additionally, it would be particularly useful to eliminate the need for a reflective polarizer, which may be possible where uniformity and brightness are sufficiently improved.

Thus, it can be seen that there is a need for an LED backlight solution that can be inexpensively manufactured, has minimal thickness, and provides color mixing with good uniformity, high brightness, and high levels of efficiency.

SUMMARY OF THE INVENTION

It is an object of the present invention to advance the art of backlight illumination and to provide the high level of color mixing needed to take advantage of solid-state light sources. The present invention provides a backlight apparatus for directing light toward a display panel, comprising:

a) two or more elongated illuminators, wherein at least one elongated illuminator is disposed to direct light towards the display panel and comprises:

(i) a solid transparent elongated light channel, extended along an illumination plane that is substantially parallel to the display panel and directly below the display panel;

(ii) an associated solid state light source for providing light to the elongated light channel;

(iii) a light extraction element for redirecting light upwards from the light channel towards the display panel; and b) a light diffusing element for uniformizing the light redirected from the two or more elongated illuminators to provide backlight illumination.

The invention also provides variations in the backlight apparatus and a display employing the backlight apparatus. A process for providing light is also disclosed. It is a feature of the present invention that it provides a backlight that utilizes multiple illumination channels.

It is an advantage of the present invention that it employs solid-state light sources to provide area backlighting for a display. The apparatus of the present invention is scalable and is particularly adaptable to larger sized LC panels.

It is a further advantage of the present invention that it eliminates the need for a light guide plate or other planar type panel, which can help to reduce cost and dimensional profile for backlight components.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIG. 7A is a side view of a display apparatus using the elongated illuminators and diffuser of the present invention;

FIG. 7B is a side view of a display apparatus with an additional collimating element in the illumination path;

DETAILED DESCRIPTION OF THE INVENTION

The present invention provides a backlight apparatus that is well-suited to display applications, particularly for LC display panels, such as those used for LCD TV, medical diagnostics displays, imaging displays, and military displays, for example. In addition, the backlight apparatus of the present invention can be used for other illumination applications where solid-state lighting is advantageous.

In the context of the present disclosure, the term "solid-state light source" has its conventional meaning accepted by those in the illumination arts, indicating a type of emissive light source formed from semiconductor materials. Solid-state light sources include, for example, Light-Emitting Diodes (LEDs), Organic Light Emitting Diodes (OLEDs) and (Polymer Light Emitting Diodes) PLEDs, as well as semiconductor lasers. Generally the term solid state light source as used herein means any source of light from a small point-like source but the design of the emission source may be such that the light being emitted is either collimated or spread so as to appear to be non-point-like. An array of several solid state light sources may be arranged in a manner or with lens elements so as to combine the light in a broader non-point-like source.

In the context of the present disclosure, light direction is described as upwards. A backlighting apparatus thus emits light upwards from an illumination plane. The terms "below" and "above" then comply with this direction assignment. A display panel is a transmissive spatial light-modulating device, such as an LC display device or other array of light valves. The term linear or elongated as used herein with respect to illuminator and light channels means much longer in length than in width, typically approaching the length of the display in one (length) direction but not nearly that long in the other (width) direction. These terms include straight or curved orientations such as serpentine. Examples may include a variety of cross-sectional end-shapes such as square, rectilinear, round, triangular or they may be a composite shape of two or more shapes. At least one surface of the illuminators or light channels may comprise a means to extract or otherwise breakup or redirect the total internal reflection of the light channel. Such a means may be done in a manner provide uniform light appearance.

Figure 1:
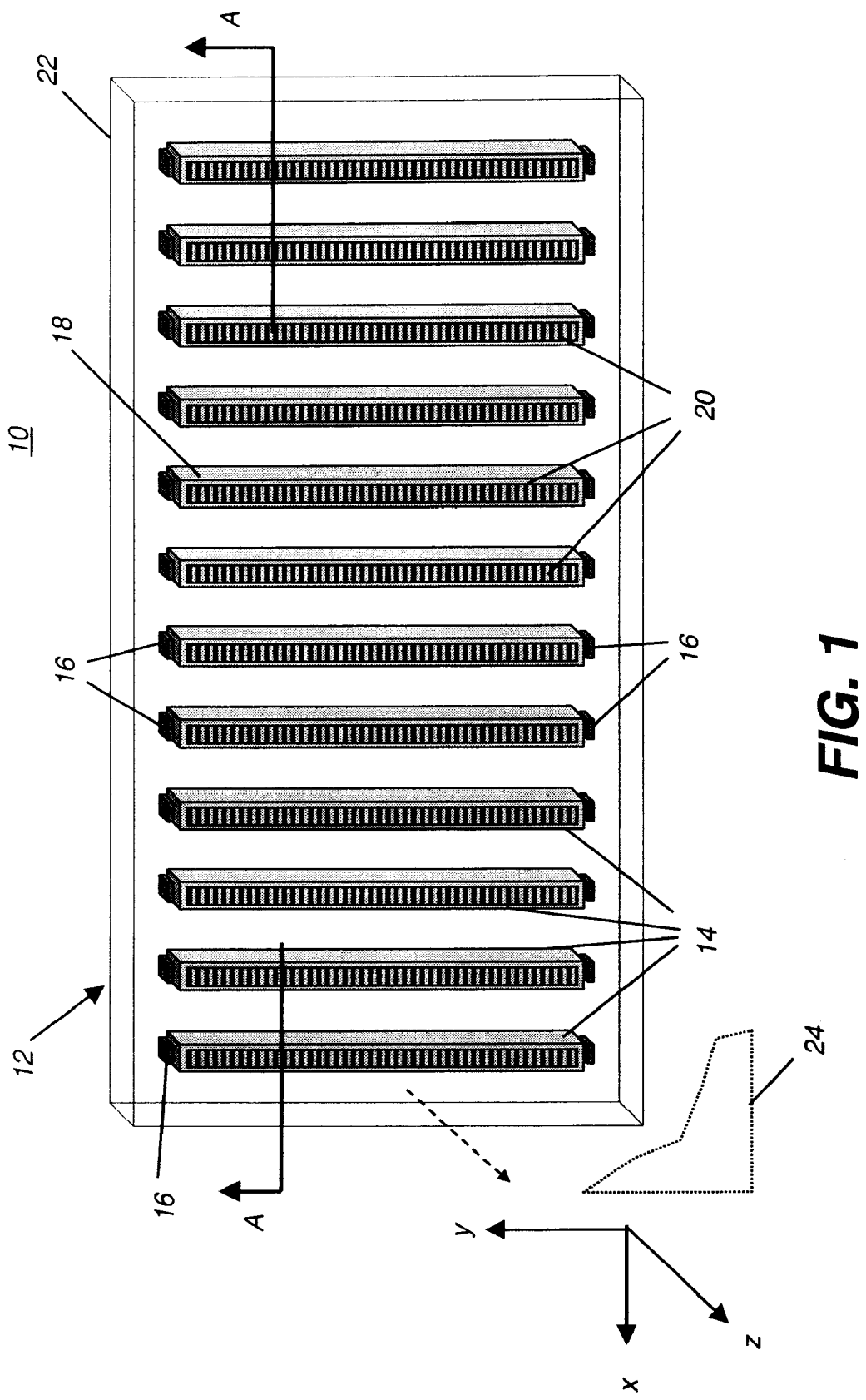
FIG. 1 is a perspective view of a backlight apparatus according to the present invention.

FIG. 1 is a perspective view of a light channel array 12 of backlight apparatus 10 according to the present invention.

Figure 2:
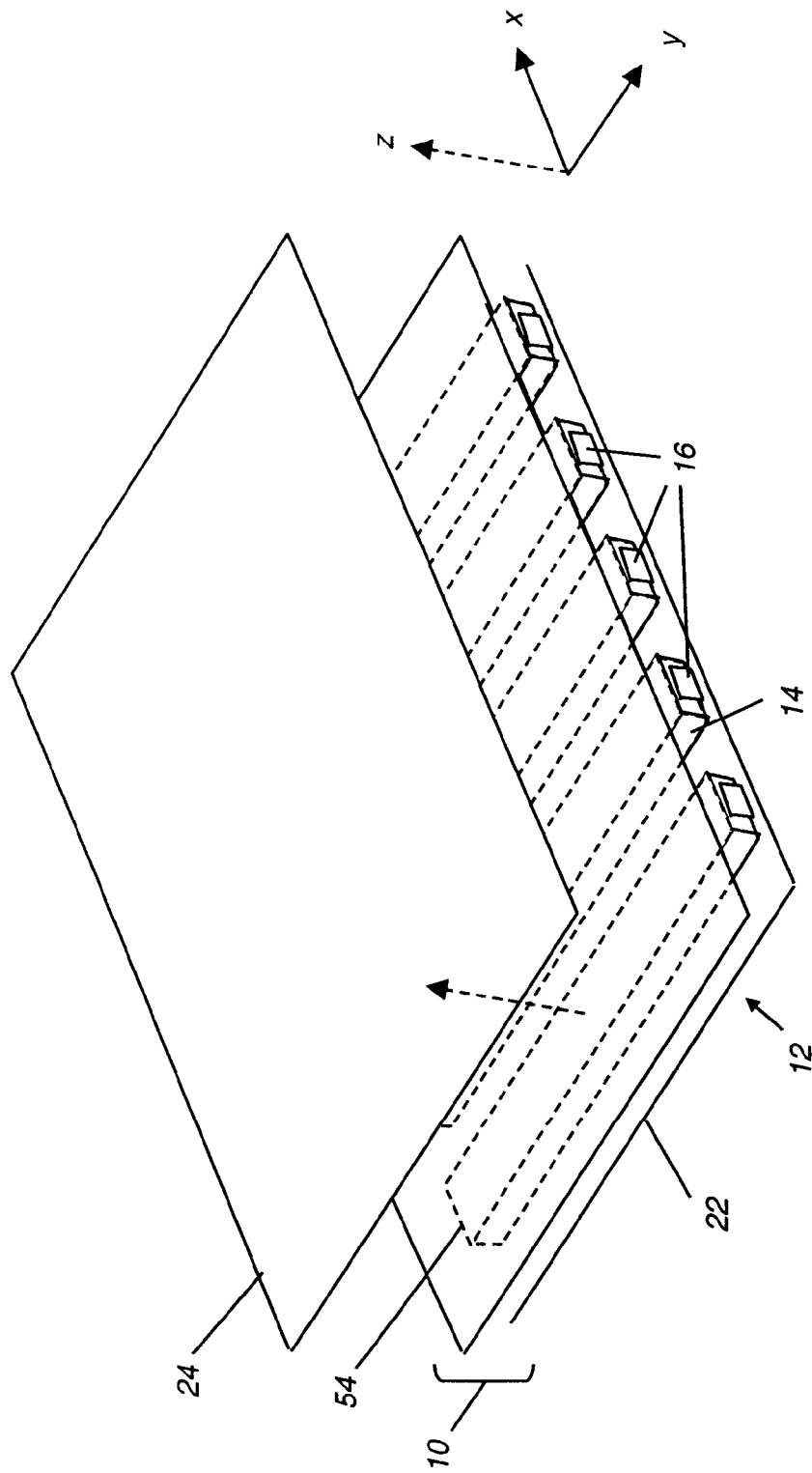
FIG. 2 is a perspective view of a display apparatus with the backlight apparatus.
Figure 3:
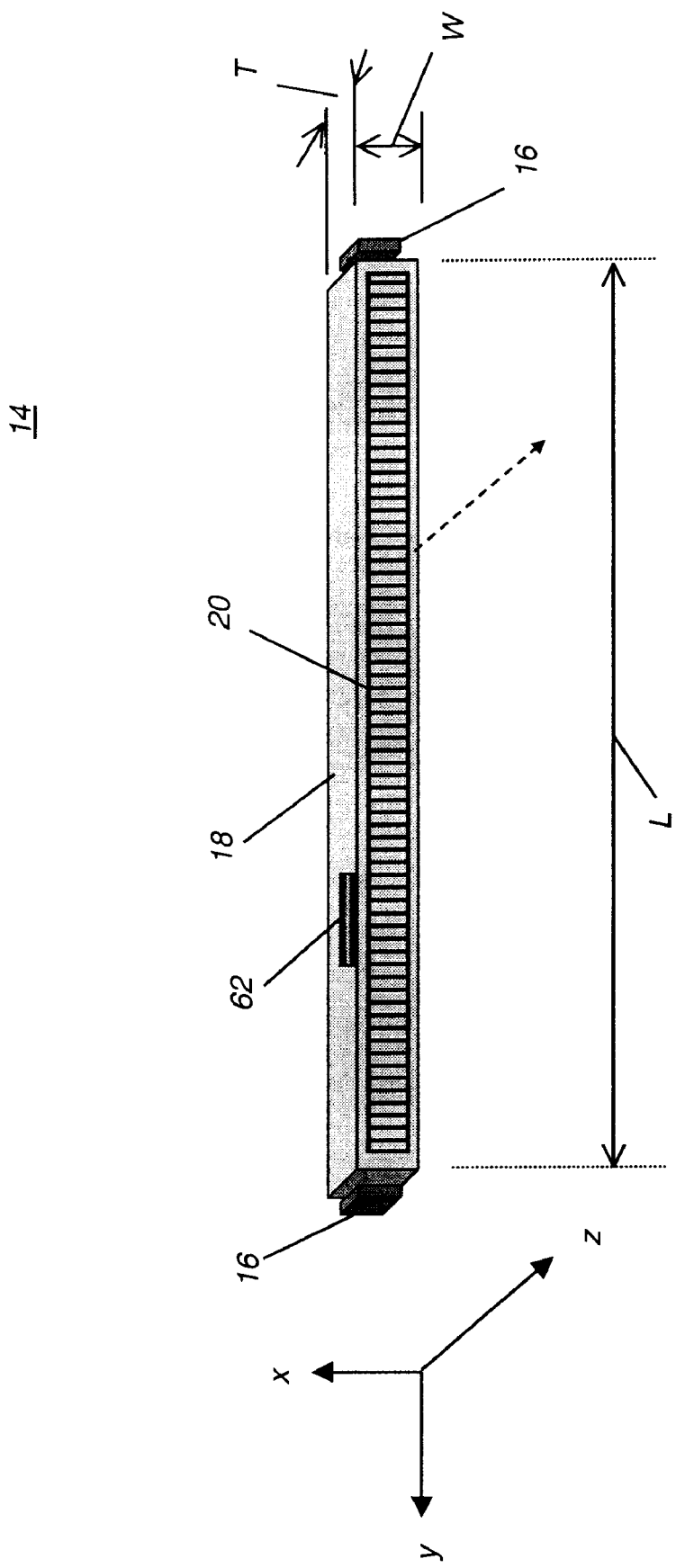
FIG. 3 is a perspective view of an elongated illuminator according to one embodiment.

FIG. 3 shows a single linear or elongated illuminator 14. Light channel array 12 (FIG. 1) has an arrangement of two or more linear or elongated illuminators 14. As is shown in FIG. 3, each elongated illuminator 14 has at least one solid-state light source 16, such as an LED, laser, or other surface-emitting light source and consists of an elongated light channel 18 and a light extraction element 20. In the particular embodiment of FIGS. 1 and 3, each elongated illuminator 14 has two solid-state light sources 16. As shown in FIG. 2, an end 54 of elongated light channel 18 could alternately be reflective.

Each elongated illuminator 14 is extended along an illumination plane 22 and redirects light upward, in the direction of a display panel 24, a corner of which is shown in dotted outline in FIG. 1, that contains a display screen. Display panel 24 and illumination plane 22 are substantially in parallel. The perspective view of FIG. 2 shows planes 22 and 24 from a top view. The primary direction of light from light channel array 12 is upward, toward display panel 24, in the general direction of the z-axis in FIGS. 1, 2, and following. Using the xyz coordinate system used in these figures, elongated illuminators 14 are extended in the general direction of the y axis and are typically spaced apart from each other by some distance along the x axis. As can be well appreciated by those skilled in the imaging arts, elongated illuminators 14 could be disposed orthogonally so that they extend in the general direction of the x axis and are spaced apart by some distance along the y axis. In subsequent description and figures, extension along the y axis is shown, but the orthogonal arrangement could alternately be used.

A type of light pipe, elongated light channel 18 has a length dimension L that is well in excess of its width dimension W or thickness dimension T. Preferably, length L is greater than 5 times width dimension W. Preferably, width dimension W and thickness dimension T differ from each other by no more than a factor of 2. In one embodiment dimensions T and W are approximately equal. Maintaining dimensions W and T at much less than length L improves color mixing and uniformity, since light that is directed into elongated light channel 18 is propagated through this light-guiding structure by means of Total Internal Reflection (TIR). Because it uses TIR, elongated light channel 18 is highly efficient, with very low light loss except in the intended direction as provided by light extraction element 20.

Rigidity of solid elongated light channel 18 helps to provide more uniform light output, since the distance between illumination plane 22 and display panel 24 is best kept constant. In the context of the present disclosure, the descriptive term "rigidity" applies to an element that exhibits no visible bowing or bending due to its own weight. This arrangement also simplifies assembly of elongated light channels 18 into light channel array 12. In cross-section, elongated light channel 18 may be square, rectangular, or circular, or have some other shape. For example, solid elongated light channel 18 can have variously curved sidewalls for improved mixing of light from LED light sources 16. The cross-sectional shape or dimensions may change over the length of elongated light channel 18, so that elongated light channel 18 is tapered, as shown in subsequent examples, or otherwise changes its cross-sectional shape.

Figure 4:
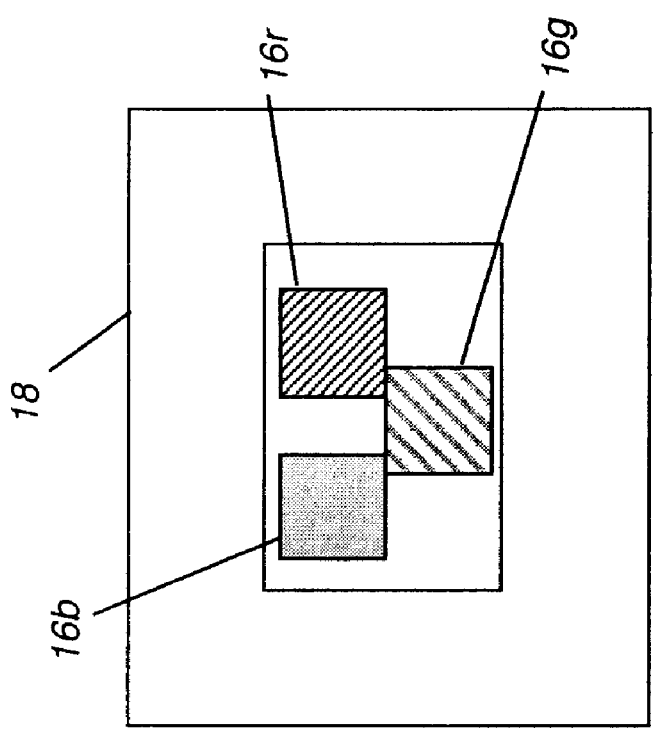
FIG. 4 is a plan view showing LEDs at one end of a light pipe of the elongated illuminator.

FIG. 4 is a plan view of elongated light channel 18 from the side, showing a color triad arrangement of red, green, and blue LED light sources 16r, 16g, and 16b, respectively. This arrangement is particularly advantageous, allowing light from each RGB LED light source 16r, 16g, and 16b to be well mixed within elongated light channel 18, so that a high degree of color uniformity is achieved. As noted earlier, achieving a high level of color uniformity when using RGB LEDs can be a significant challenge. A single LED 16 might alternately be used, such as a white light LED. Alternately, additional color LEDs can be used to increase brightness or enhance color gamut, such as to provide an RGGB arrangement or to add cyan, orange, or other colors. Other lighting arrangements are also possible, as is described in more detail subsequently.

Figure 5:
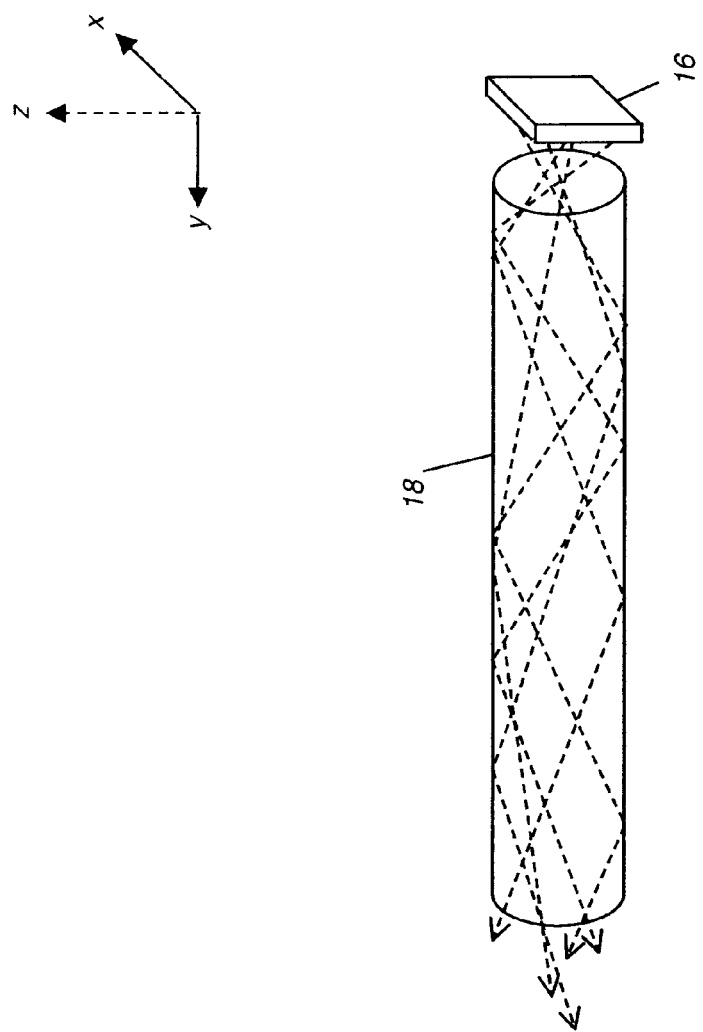
FIG. 5 is a perspective view of an elongated light pipe in one embodiment.

FIG. 5 is a perspective view showing TIR reflection within a small segment of elongated light channel 18. As this figure shows, light from LED 16 can be reflected multiple times from inner edges of elongated light channel 18. As a general rule, a high number of reflections is desirable; improved mixing is achieved with an increased number of reflections. Thus, forming elongated light channel 18 so that its length is at least greater than 10 times its width helps to provide more uniform color mixing.

Figure 6B:
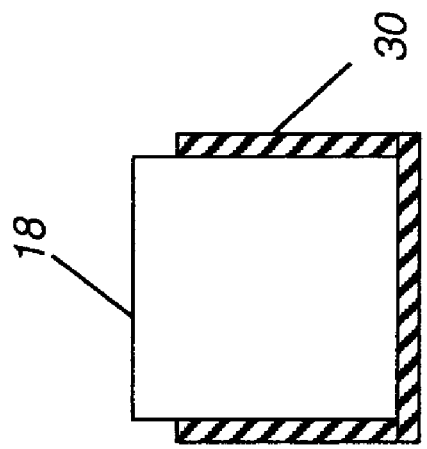
FIGS. 6A and 6B are cross-sectional views of an elongated illuminator in different embodiments.
Figure 6A:
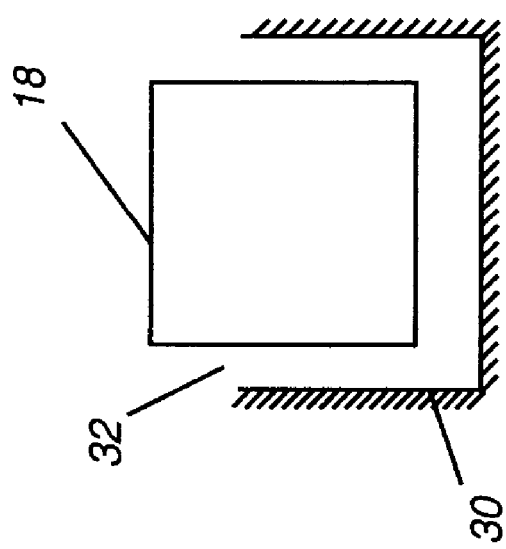

As shown in cross-section in FIGS. 6A and 6B, elongated light channel 18 may also have a reflective surface 30, such as a silver mirrored surface. The optional reflective surface 30 redirects light toward display panel 24 (FIG. 2). Reflective surface 30 may be separated from elongated light channel 18 by an air gap 32, as shown in FIG. 6A, or may be integral, formed on the surface of elongated light channel 18 as shown in FIG. 6B.

Figure 7C:
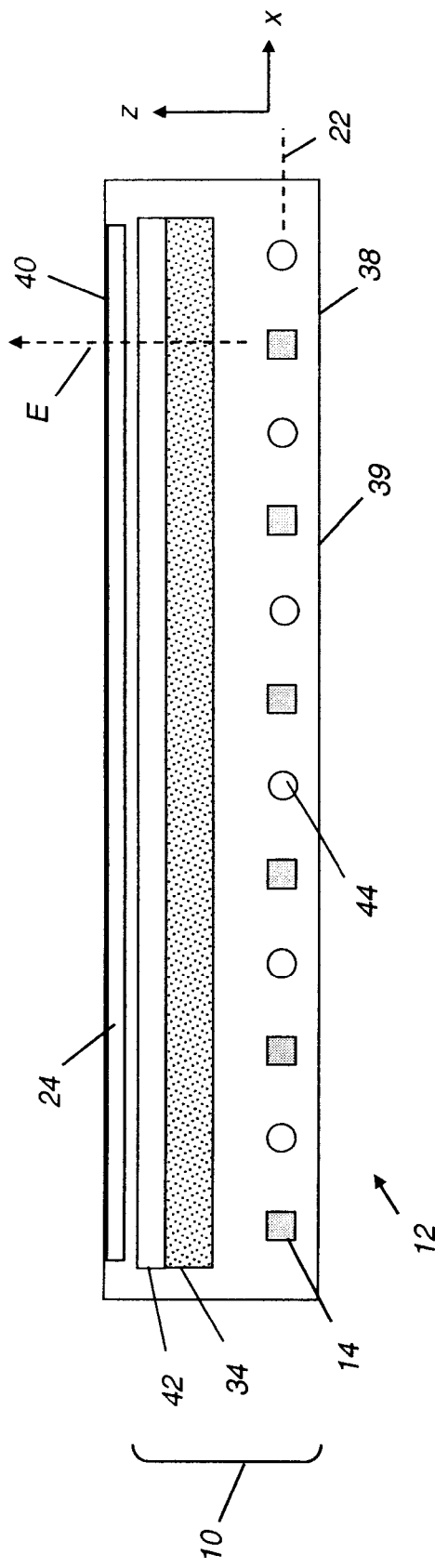
FIG. 7C is a side view of a display apparatus in a hybrid source configuration.

FIGS. 7A, 7B, and 7C show cross-sectional views corresponding to the view indicated as section A-A in FIG. 1 for different embodiments of a display apparatus 40 using backlight apparatus 10 with light channel array 12 of the present invention. Backlight apparatus 10 includes a diffuser 34 for providing improved uniformity and may contain one or more optional light management films 42, possibly having one or more adhesive layers. A display panel 24 can be an LC display panel. Emitted light E is directed predominantly towards display panel 24 from illumination plane 22. Elongated illuminators 14 are housed within a lightbox 38 having reflective side and rear walls, made reflective using scattering or specular reflectors or coatings. Elongated illuminators 14 are thus suspended above the rear reflective surface 39 of lightbox 38.

Diffuser 34 could be a bulk type diffuser that employs pigments, air voids, or internal glass beads. Alternately, diffuser 34 could be a surface type diffuser, for example, a beaded surface with mono or multi-sized beads with a transparent binder. A Fresnel lens type diffuser could also be used.

FIG. 7B shows the addition of a collimator 36 to display apparatus 40. Collimator 36 helps to collimate emitted light with respect to the xz plane, using the coordinate assignment shown. In one embodiment, collimator 36 is an array of cylindrical Fresnel lenses having some optical power in the xz plane, but zero optical power in the orthogonal (y) direction. Other options for collimator 36 include a cylindrical lens array, a holographic structure, a TIR lens array, or a prism array. Collimator 36 should have sufficient stiffness to support itself at a suitable distance from illumination plane 22 and may require additional supports (not shown) for this purpose.

FIG. 7C shows an embodiment of display apparatus 40 having a hybrid illumination arrangement within backlight apparatus 10. Here, one or more lamps 44, such as CCFL light sources, are provided along with elongated illuminators 14. Lamps 44 may provide white light or may provide light of a specific color, such as green for example, which may be deficient with some LEDs.

Light management films 42 may include various types of light enhancement films or Brightness Enhancement Films (BEF), such as Vikuiti™ Thin Brightness Enhancement Film, a product of 3M, St. Paul, Minn. Polarizers can also be provided, such as reflective polarizers.

Figure 8A:
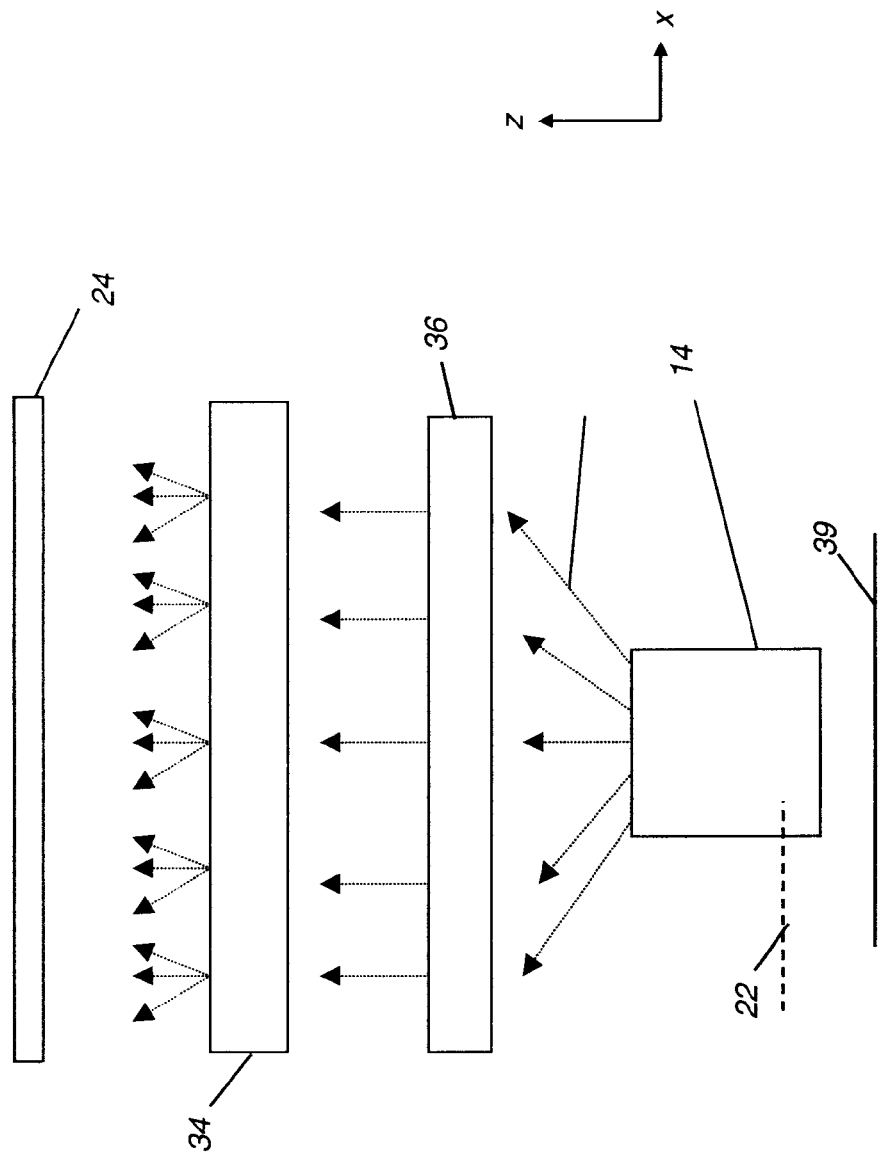
FIG. 8A is a side view showing light emission, collimation, and diffusion for the embodiment shown in FIG. 7B.
Figure 8B:
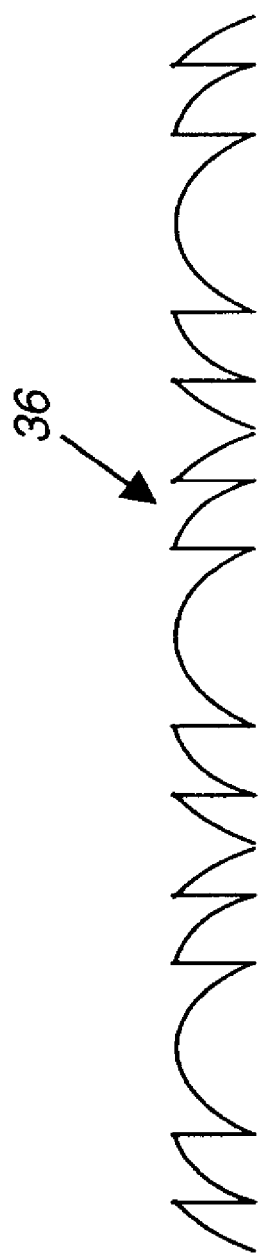
FIG. 8B shows a magnified cross-section view of a Fresnel-type cylindrical lens collimator for the embodiment shown in FIG. 7B.

The side view of FIG. 8A shows how light is directed from elongated illuminator 14 when collimator 36 is used. Light directed outward from elongated illuminator 14 is generally in the direction of display panel 24, but is emitted over a range of angles. Preferably, the light emissive surface of elongated illuminator 14 is near the focal plane of collimator 36. This light goes to collimator 36, which redirects the light in a direction that is toward normal, with respect to display panel 24. Diffuser 34 then spreads the collimated light over a small range of angles to provide a more uniform backlight to display panel 24. FIG. 8B shows a magnified cross-section view of a Fresnel-type cylindrical lens collimator 36 such as might be used in the embodiment of FIG. 7B.

Figure 9:
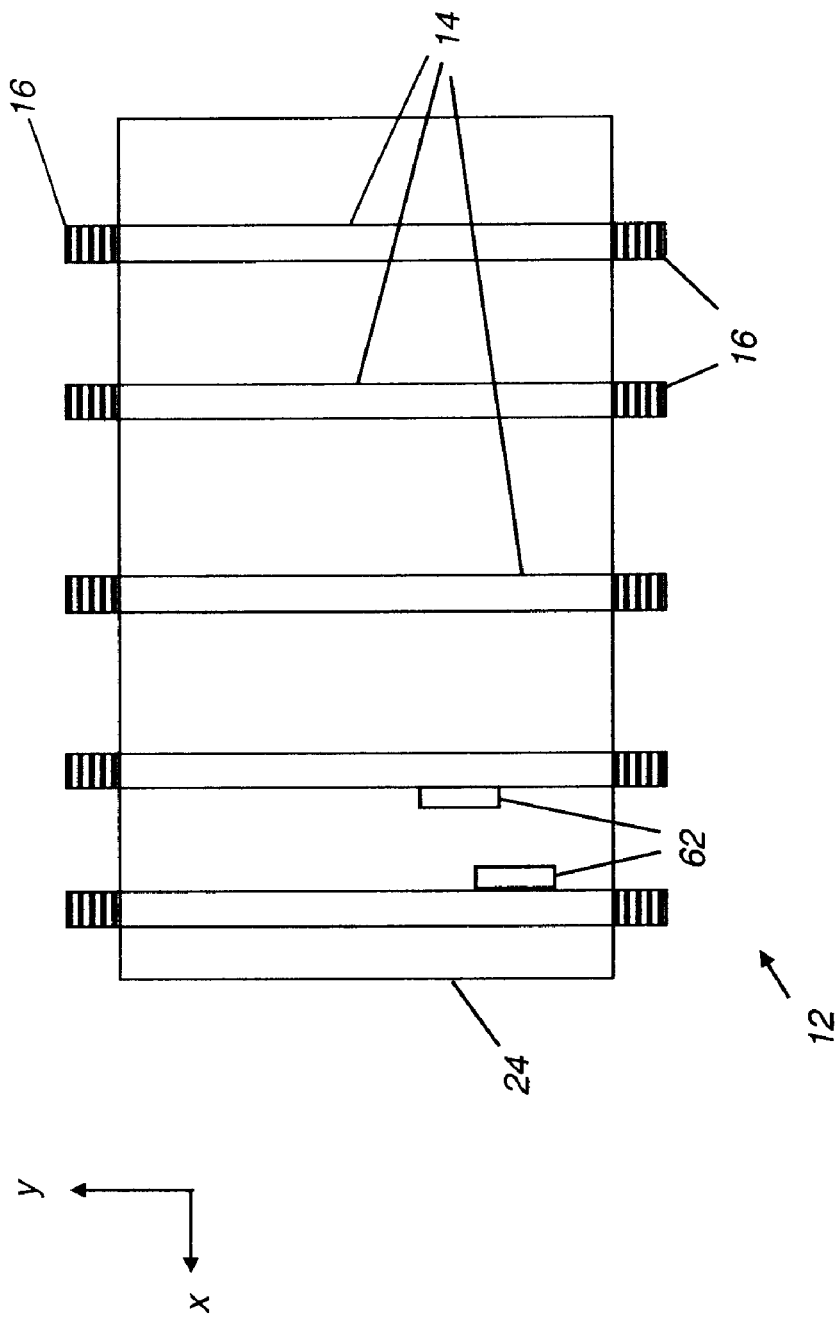
FIGS. 9, 10, 11, and 12 are plan views of the backlight apparatus showing different possible arrangements of elongated illuminators.
Figure 10:
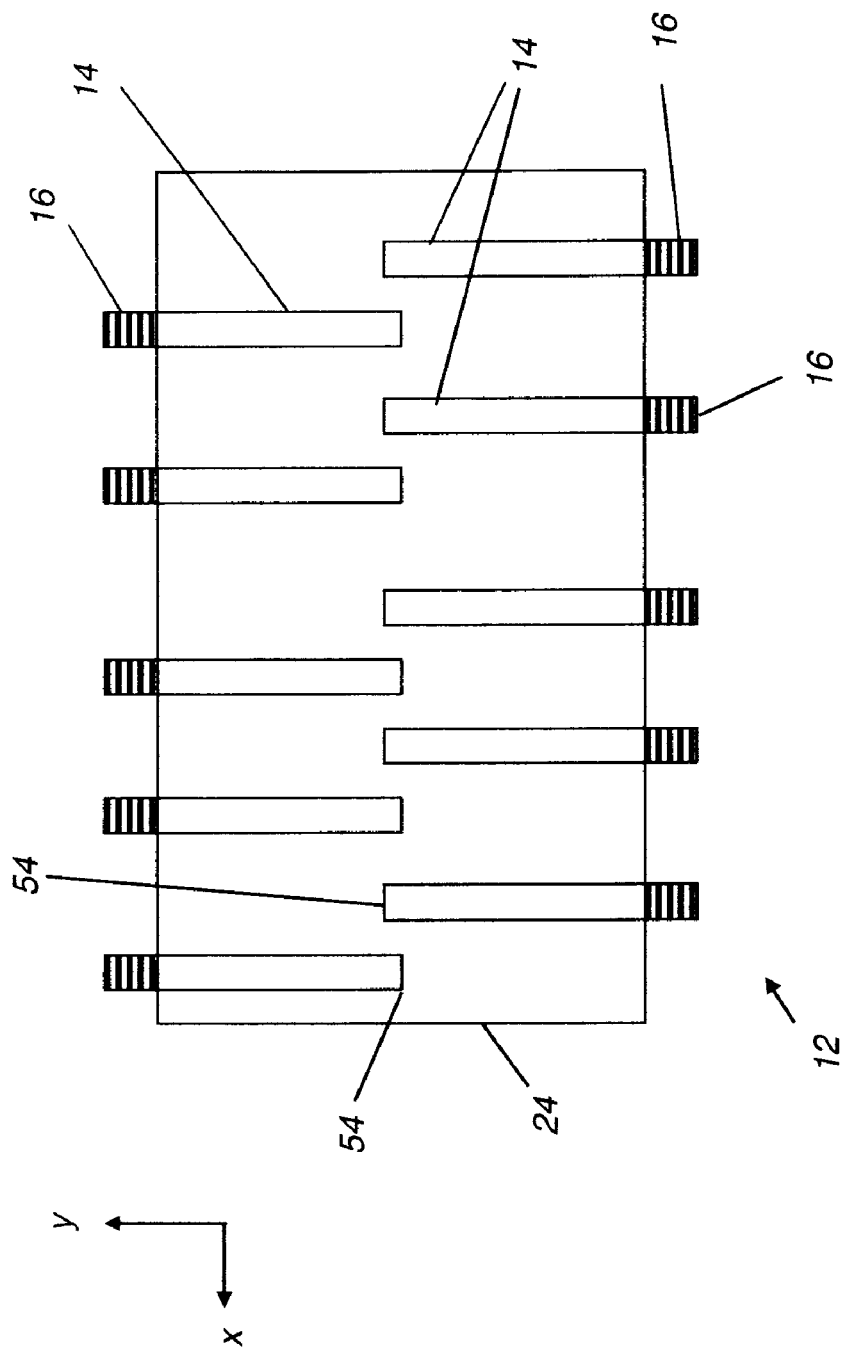
Figure 11:
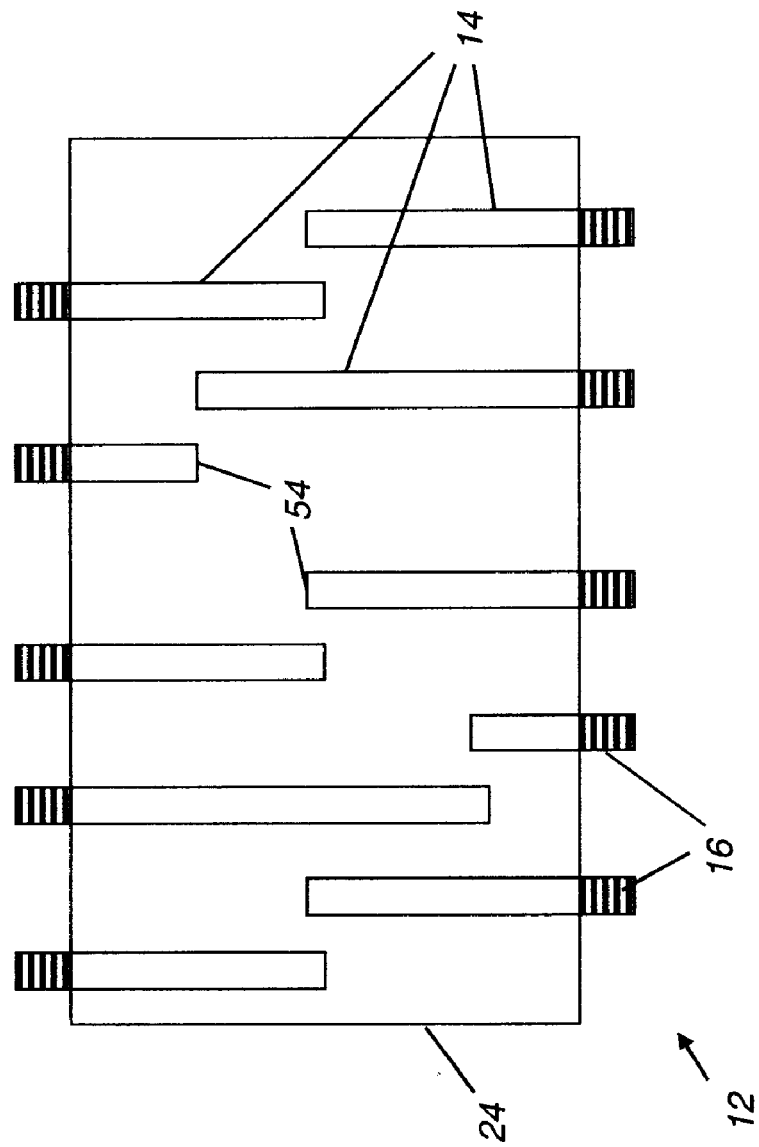

Elongated illuminators 14 in light channel array 12 may be distributed in any of a number of configurations, as shown in the plan view examples of FIGS. 9, 10, 11, and 12. In the FIG. 9 arrangement, elongated illuminators 14 extend the full width of display plane 24 and are distributed at various distances from each other in the x direction. Here, each elongated illuminator 14 has two light sources 16, one at each end. In FIGS. 10 and 11, elongated illuminators 14 do not extend the full width of display plane 24, but may have equal or unequal lengths, as determined by requirements for display plane 24. Ends 54 not having a corresponding light source 16 may be reflective. An arrangement similar to that of FIG. 11, for example, may have benefits for uniformity, since it would be difficult to detect a pattern in emitted light.

The separation distance between adjacent elongated illuminators 14 can be varied based on factors such as the needed brightness, area, and uniformity. Adjacent elongated illuminators 14 can be adjacent, but not optically coupled.

Figure 12:
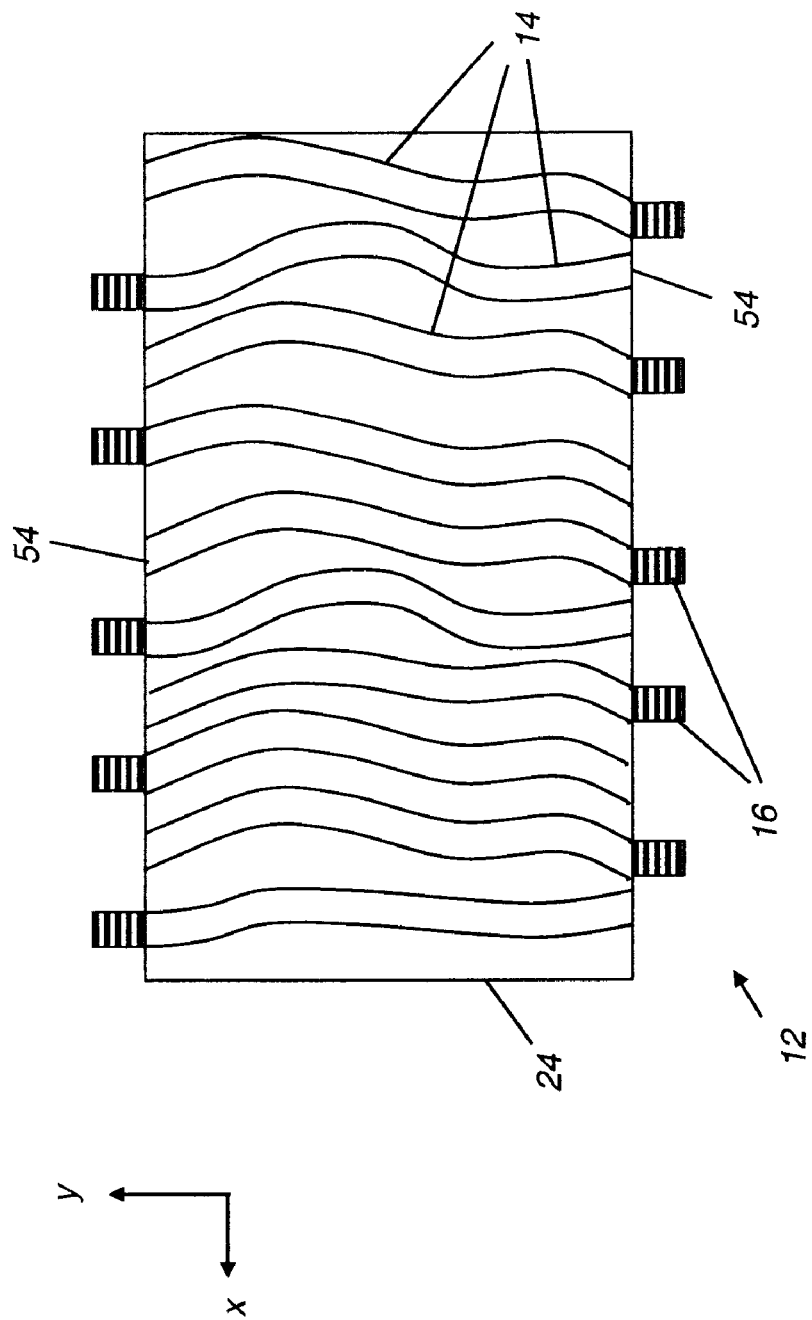

The arrangement of FIG. 12 shows elongated illuminators 14 having more serpentine extension profiles. Numerous alternative arrangements are possible and there can be display embodiments for which it is beneficial to extend elongated illuminators 14 with some amount of curvature.

Figure 13:
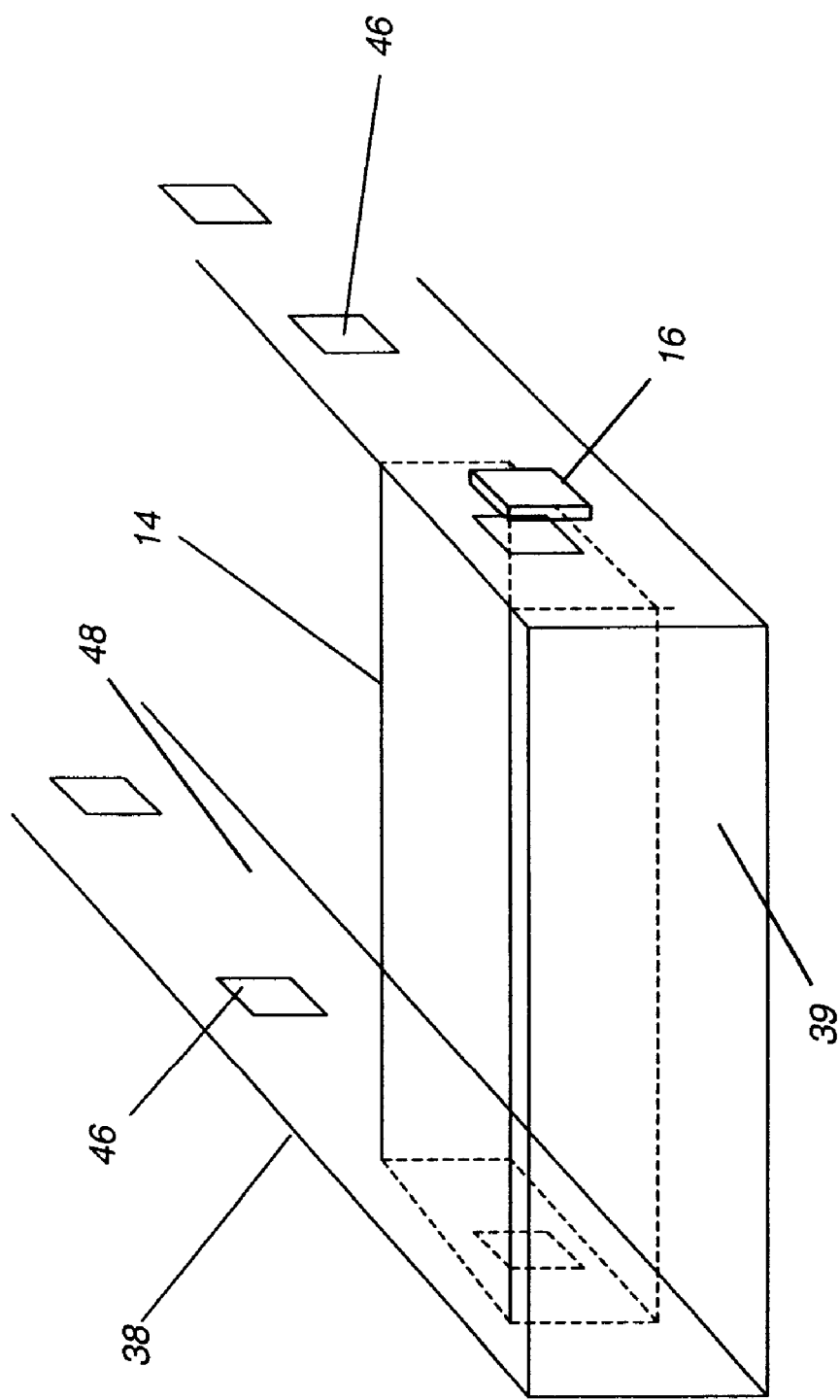
FIG. 13 is a perspective view of an elongated illuminator within a light box.
Figure 14:
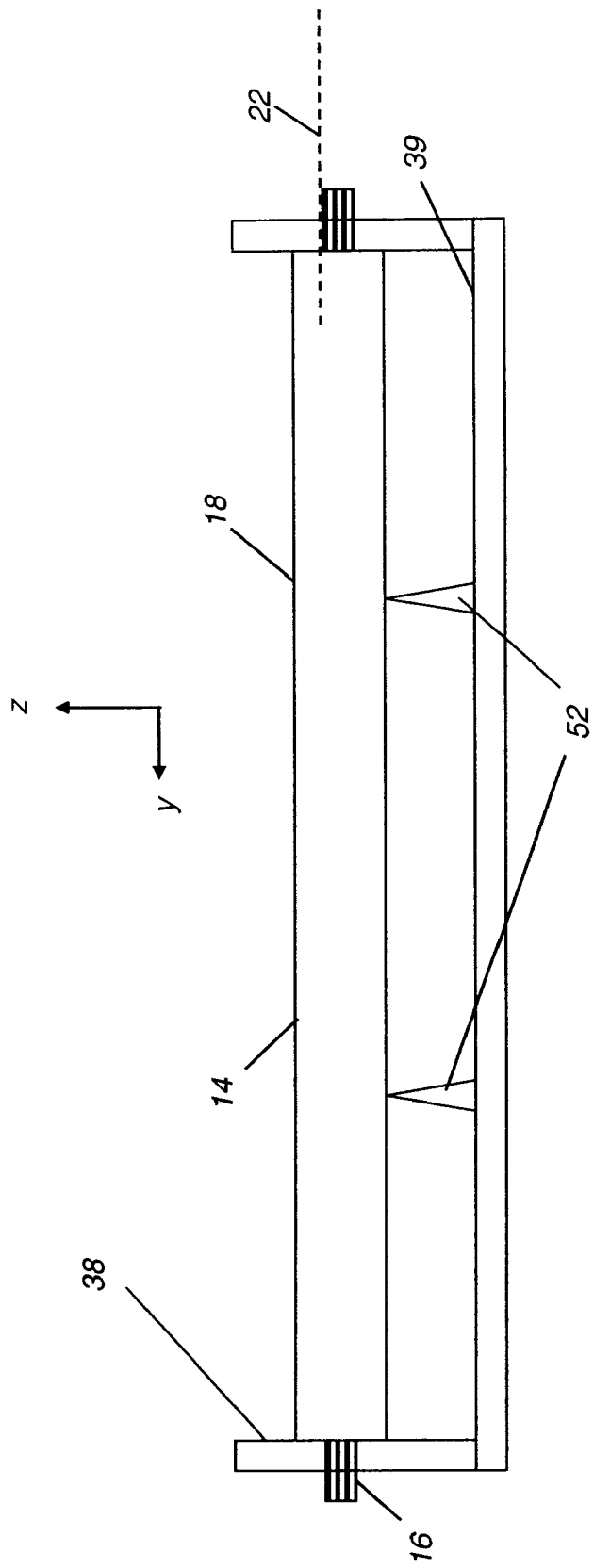
FIG. 14 is a side view of an elongated illuminator showing optional supports.

The perspective view of FIG. 13 shows an embodiment with a light box 38 for housing elongated illuminators 14. Here, light box 38 has apertures 46 for directing light into each elongated illuminator 14. Aperture 46 can also be used to hold elongated illuminator 14 in position, where a segment of elongated illuminator 14 protrudes through this opening. A reflective surface 48 may also be provided within light box 38 as was noted earlier. Other light-directing structures can be provided within light box 38. The side view of FIG. 14 shows a pair of supports 52 used within light box 38 to maintain elongated light channel 18 straight and in position with respect to illumination plane 22.

Fill factor can be an important consideration for achieving needed brightness levels, as well as for mixing spectral components where light sources 16 of different wavelengths are used. Fill factor for each elongated illuminator 14 would be computed as the ratio of the surface area of the one or more light sources 16 that direct light into light channel 18 to the incident light surface area of light channel 18. Fill factor for backlight apparatus 10 would be computed as the ratio of the sum of the emissive areas of elongated illuminators 14 to the surface area of illumination plane 22 of the apparatus.

Light Sources

Each elongated illuminator 14 has at least one independent solid-state light source 16. Solid state light source 16 can be independent in that it delivers light only to its corresponding light channel 18, rather than to multiple light channels 18.

Solid-state light sources 16 could be LEDs, as noted earlier. LEDs are advantaged due to their high brightness and good spectral characteristics. Providing direct light emission within narrow wavelength bands, LEDs are thus capable of providing illumination that offers an improved color gamut over conventional light sources. CCFL sources, for example, offer about 70% of the NTSC color gamut when used with an LCD panel. LED sources can achieve 100% or greater of the NTSC range. LEDs also are advantaged because they can be rapidly pulsed.

Light channel 18 of the present invention provides a high degree of color mixing for LEDs. Unlike light guiding plates and other conventional solutions, light channel 18 has relatively narrow width dimensions. This arrangement yields a substantial number of reflections as light propagates down the path provided by light channel 18. TIR activity. Red (R), Green (G), and Blue (B) LEDs can be positioned as an RGB triad of LEDs at one or both ends of light channel 18. An RGGB arrangement, with more than one LED of one or more colors could alternately be used to boost the green light level. Alternately, R, G, and B LEDs could be distributed at different ends of light channel 18, so that, for example, a single light channel 18 has a Red and a Green LED on one end and a Green and a Blue LED on the other end. Optionally, a fourth LED, such as a white light LED, or other color LED, could be positioned at one or both ends of light channel 18. In another embodiment, each separate light channel 18 could have a single color light source 16, so that, for example, three adjacent light channels 18 have Red, Green, and Blue LEDs respectively.

Figure 18:
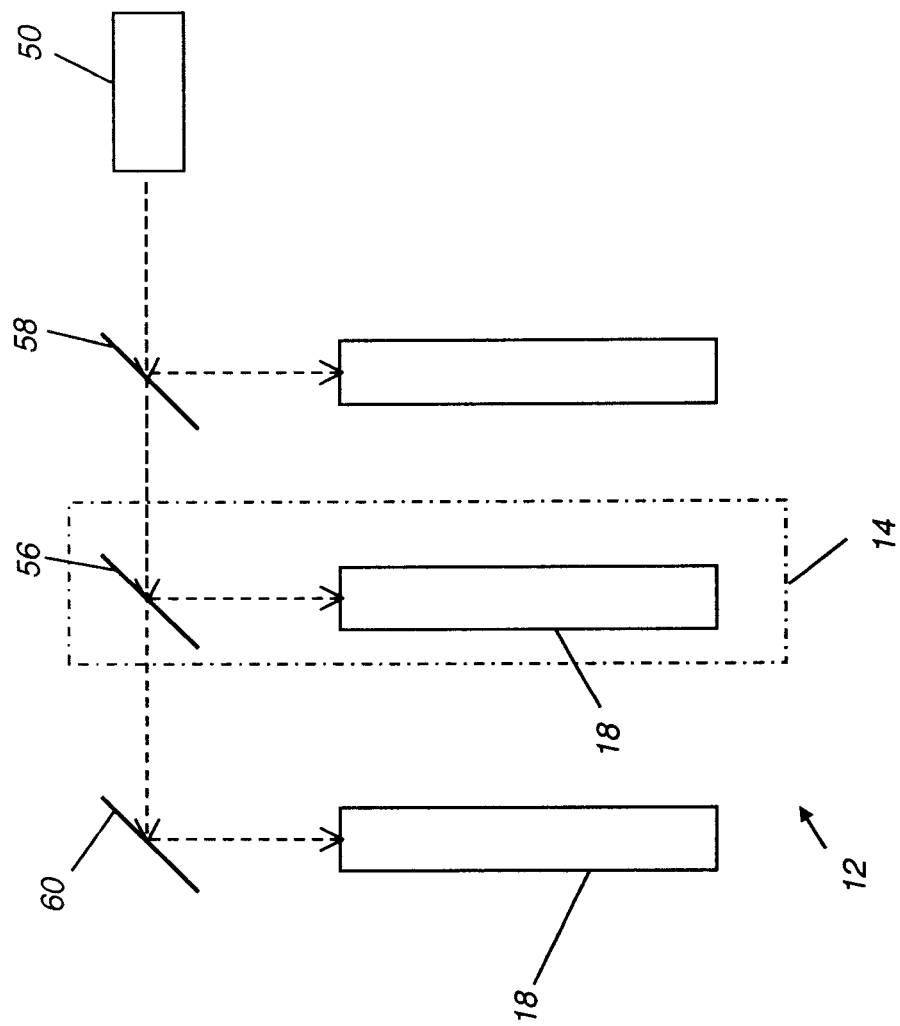
FIG. 18 is a schematic block diagram of a portion of a backlight apparatus using dichroic and reflective surfaces for obtaining light.
Figure 19:
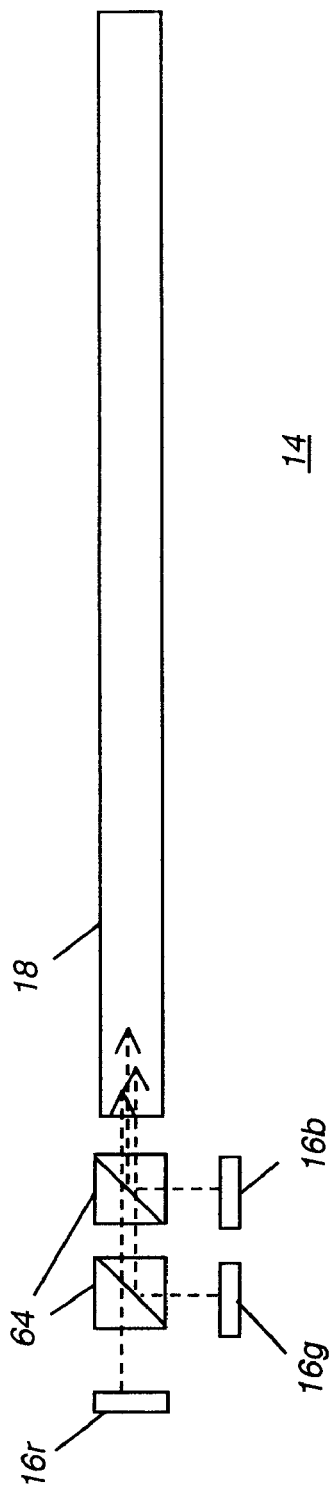
FIG. 19 is a schematic block diagram of a portion of a backlight apparatus using beam splitters for combining light of different spectral bands onto a single path.

Dichroic filters could be used to direct light into individual elongated light channels 18. Referring to FIG. 18, for a portion of backlight apparatus 10, a polychromatic light source 50 directs light through dichroic filters 56 and 58 that reflect blue and green wavelengths, respectively, into individual light channels 18. Red light is then reflected to another light channel 18 from a mirror 60. As shown in dotted outline, elongated illuminator 14 in this arrangement consists of a reflective surface, such as dichroic filter 56, and elongated light channel 18. Dichroic filters 56 and 58 could be replaced by amplitude or polarization beam splitters. In another embodiment, as shown in FIG. 19, amplitude or polarization beam splitters 64 are used to combine light from red, green, and blue light sources 16r, 16g, and 16b, respectively, so that this combined light is directed into light channel 18.

Light sources 16 can be continuously on, so that mixed RGB or white light is provided to display plane 24. Alternately, color sequential backlighting arrangements are possible. In one embodiment, R, G, and B are rapidly cycled from backlight apparatus 80 by activating the corresponding light sources 16 in sequence. Alternately, a linear scan can be provided, with R, G, and B or other colors provided in a scrolling sequence across the surface of backlight apparatus 10. Display plane 24 can then activate corresponding rows or columns of pixels with the same sequence, providing sequential modulated color. Such an arrangement would obviate the need for a color filter array, for example, with an LC display. Mixed colors such as cyan, magenta, and yellow could alternately be provided using timed activation of light sources 16.

Laser light sources could alternately be used with elongated illuminator 14 of the present invention. Their relative spectral purity and fast response times make lasers an attractive alternative for some types of display applications. The high brightness and high optical power levels of lasers may allow a single source to illuminate multiple elongated light channels 18, such as using the arrangement shown in FIG. 18.

Figure 16:
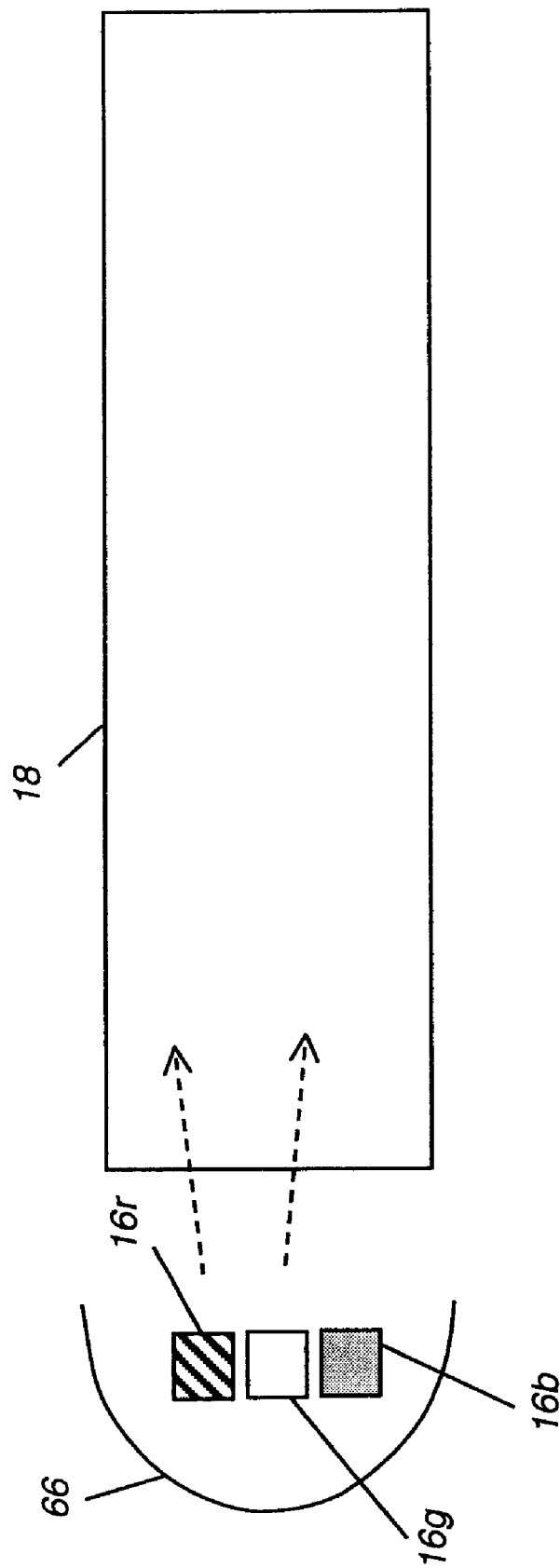
FIG. 16 is a plan view of a light pipe with a reflective surface for its associated light sources.

FIG. 16 shows an alternate arrangement in which light sources 16r, 16g, and 16b are supported by a curved reflective surface 66, such as a parabolic mirror, for example. This arrangement helps to direct light into light channel 18 from one or more LED sources.

Alternative light sources that are can be used with elongated illuminator 14 may include Organic Light Emitting Diodes (OLEDs) and (Polymer Light Emitting Diodes) PLEDs.

Light Channels

Elongated light channels 18 are formed from highly transparent materials, including various types of glass, such as a laminated safety glass. Plastics that can be used include PMMA, polycarbonate, polyester, polyamide, polysulfone, polyolefin, cyclic-olefin and copolymers thereof. Light channels 18 may have additives for improved thermal and light stability. Optical transmission of the material should exceed about 90%. Except where intentionally treated, surfaces of light channel 18 should have an optical finish. A high index of refraction n is preferred for its favorable light-guiding properties.

In fabrication, light channels 18 could be extruded or injection-molded or could be solvent-molded. Further conditioning of the material, such as by heating and stretching, could be beneficial for achieving dimensional stability.

A high degree of stiffness or rigidity is advantageous for providing light channel 18 as a modular component for a larger backplane apparatus 10. High stiffness allows for simple handling and ease of assembly of light pipe array 12. A stiffness in excess of 10 mN is preferred. A clip, holder, or other support can be used to help prevent sagging or bowing for light channels 18 of longer length, as was described with reference to FIG. 14. Light channel 18 should have a width W dimension that is sufficient to constrain bending. Additional support structures, if needed, can be used to prevent sideways bending.

Light channel 18 is separated from light source 16 by some distance in the embodiments shown in the present application. However, it is also possible to embed light source 16 within elongated light channel 18.

Light Extraction Features

There are a number of embodiments for light extraction element 20. The basic function of light extraction element 20 of elongated illuminator 14 is to extract light that is otherwise being channeled by TIR and thereby cause light to be emitted from elongated light channel 18. This can be done in a number of ways, including the following:

(i) Treatment of light channel 18 to form an emissive surface. Types of surface treatment include forming light extraction structures along an edge of elongated light channel 18, along the surface that faces the display. For example, one approach is to form an array of prism structures along the length direction L. Microstructures used could be an array of prisms, pyramids, hemispheres, or other well-defined geometries to frustrate TIR. These can include top or bottom emitting structures, inverted, formed as individual elements, or aligned in columns. Microstructures could be molded or otherwise formed of varying shapes and sizes, as a function of the distance from the light source. One example of this approach is given in U.S. Pat. No. 5,506,929 to Tai et al., cited earlier. The surface of elongated light channel 18 could also be roughened or polished to provide light extraction element 20. Embossing or pressure can be used to form light extraction features.

(ii) Application of a light-extracting film component. One possible film for this purpose is described in commonly assigned U.S. Patent Application No. 20050270798 entitled "Brightness Enhancement Film Using A Linear Arrangement Of Light Concentrators" by Lee et al., incorporated herein by reference. Strips of a light extracting film can be applied to the surface of elongated light channel 18, using adhesive, for example. Adhesives used can be pressure- or heat-sensitive and could be curable using ultraviolet or electron-beam radiation. Chemical cross-linking materials such as epoxies could alternately be used. Adhesives capable of withstanding a broad temperature range (−40 to 85 C) are often required for LCD display applications. Adhesive that can withstand higher temperature range (60-85 degrees C.) and higher relative humidity (95% @ 65 C) would be preferred. A high degree of optical transmission would be preferred. Additives could be used to modify the refractive index of adhesives. A fine-tip dispenser or hot melt glue dispenser could be used to attach segments of a film component to a sidewall (Light emitting side directed towards the display panel or view. of light channel 18. In fabrication, light channels 18 could be placed side by side, then have a film attached to one surface, then be trimmed and separated, or packaged and used with the affixed film. Any adhesively attached material should be carefully selected so that it does not provide bending force under high heat conditions.

Optionally, the light emissive surface of elongated illuminator 14 may be featured to form light extraction structures thereon. A portion of light channel 18 can be molded such as using a roller or otherwise treated to form light-redirecting microstructures. If elongated illuminator 14 is injected molded, surface light extraction structures (their negative form) may be formed as part of the mold. Then, as the polymer is injected and cooled, the light extraction structures become an integral part of elongated illuminator 14.

(ii) Printed dots. A pattern of reflective dots, printed along a base portion of light channel 18 opposite its light emission surface, can be used to redirect light outward from light channel 18. Printed dots can be of varying density and size, helping to provide a more uniform light output. Examples of light extraction techniques using this type of approach include that described in U.S. Pat. No. 5,857,761 to Abe et al., cited earlier.

Figure 15:
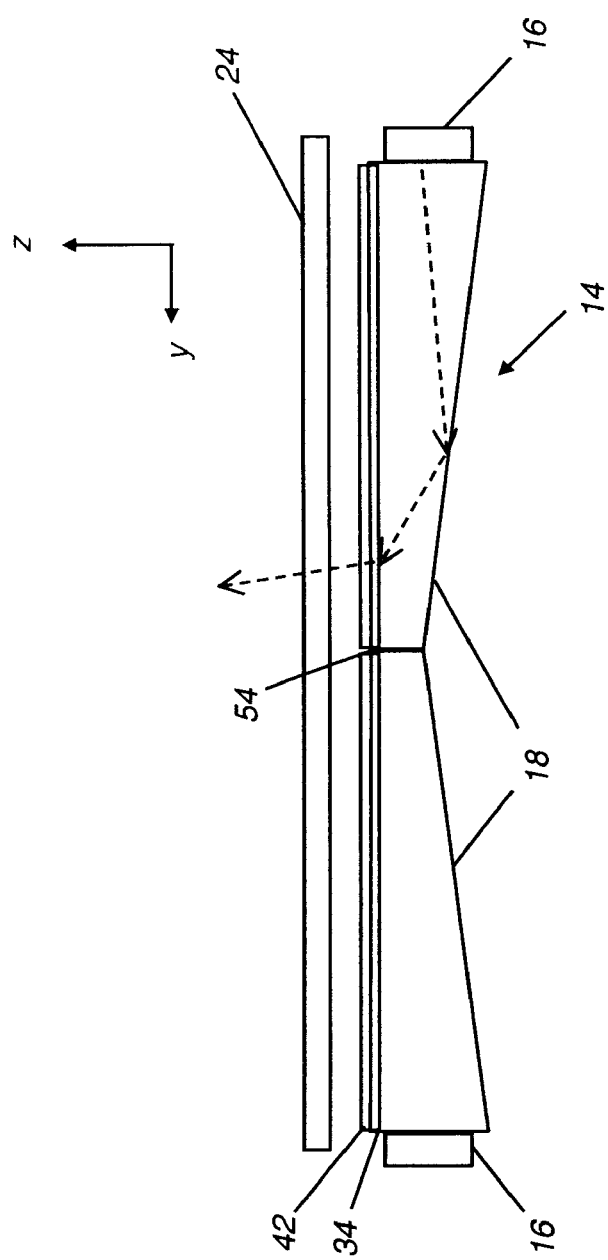
FIG. 15 is a side view of a pair of elongated illuminators in an alternate embodiment.

(iii) Shaping of elongated light channel 18. Light channel 18 could be formed with a tapered profile. In one embodiment, light channel 18 is tapered and extends the full width of display plane 24. The side view of FIG. 15 shows an alternate arrangement using two tapered light channels 18. End 54 can be reflectively coated or can be optically coupled to the adjoining light channel 18, so that two elongated illuminators 14 share some of the same light and are extended along the same line.

(iv) Volume-scattering. As another option, micron-scale particles can be dispersed inside light channel 18 to create scattering due to a refractive index mismatch.

(v) Internal mirrors. As described in U.S. Pat. No. 6,104,371 entitled "Modular, High-Intensity Fiber Optic Backlight for Color Displays" to Wang et al., TIR can be interrupted by reflective structures that are formed within a light guide.

Combinations of these types of treatments listed in (i) through (v) above could also be used. Light extraction features could be individual elements. In order to provide uniform light emission along the length of light channel 18, the size and density of the coupled area may vary as a function of the distance along light channel 18 from solid-state light source 16. For example, where there are LED light sources 16 at each end of light channel 18, light extraction features could be distributed with higher density near the center than toward the ends. Alternately, the distribution density of light extraction elements 20 could be substantially continuous in one direction.

Light extraction may be provided on more than one surface. The opposite side of light channel 18, furthest from the LCD and output surface, generally provides a smooth surface to prevent light leakage but may alternately be structured, treated, or roughened to enhance the amount of light extraction.

Light extraction elements 20 may be molded into, embossed, pressed, adhered, or laminated to the side of light channel 18 that faces display panel 24 or other light output side. Light extraction elements 20 may also include polarization elements, so that polarized light is extracted from light channel 18.

Monitoring Color Shifts

One well-known problem with LEDs and other types of solid-state light sources relates to spectral stability and accuracy, which can cause some amount of color shifting. As is shown in FIGS. 3 and 9, an optional color sensor 62 can be provided as a component of one or more elongated illuminators 14. Color sensor 62 can be used in a control loop that compensates for color shifts such as can be due to ageing, heat, or manufacturing differences between LEDs or other types of light source 16. Optionally, image data for pixels nearest a particular light pipe can be adjusted to compensate for detected color shifts.

System Considerations

Using any of a number of devices currently available, elongated illuminator 14 of the present invention is capable of providing a high level of illumination, at between 2000-6000 nits or higher. At high energy levels, heat buildup can be a problem with LEDs in some applications. Backlight apparatus 10 can provide one or more heat sinks, cooling fans, or other mechanisms to help dissipate excess heat during operation. Advantageously, heat-dissipating components can be positioned along peripheral edges of a display device, away from the LCD panel when using the apparatus and methods of the present invention.

Figure 17:
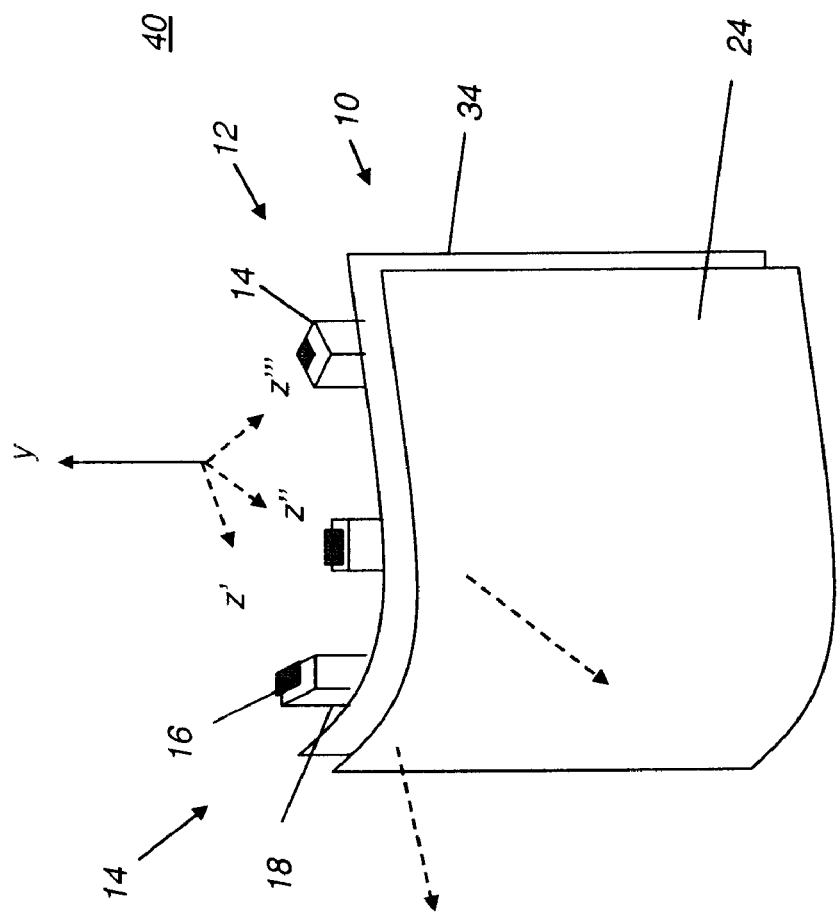
FIG. 17 is a perspective view of a curved display apparatus using the backlight of the present invention.

FIG. 17 shows an example embodiment of display apparatus 40 having a curved display panel 24. Here, the illumination provided by elongated illuminators 14 in light channel array 12 is not provided in a plane, but along a curved surface, with light redirected along axes z', z", and z"', each of which are at a normal to the curved surface of display panel 24, with a generally "piecewise parallel" arrangement. While such an arrangement may not be optimal for some types of LC components, other types of transmissive light modulating components could be used with backlight apparatus 10 having some degree of curvature, as shown.

EXAMPLES

One embodiment uses an acrylic light pipe as light channel 18, nominally ¼ in. square in cross section. The light pipe is highly transparent and has an optical finish on all sides and ends. To form light channel 18, a larger acrylic square bar (0.25"×0.25"×6 feet) was sawed into 14 inch segments and the ends were polished on a lathed. A piece of light extraction film was attached to one surface of light channel 18 with UV epoxy, dispensed using a syringe to form a uniform narrow epoxy bead down the length of light channel 18. The adhesive was then cured under a UV lamp.

An LED array is used as light source 16. Multi-die RGB LEDs are mounted in close proximity to light channel 18. These multi-die LEDS consist of 1 red, 1 blue and 2 green die in a single package (OSRAM OSTAR Projection devices, type LE ATB A2A, from OSRAM, Inc.) These devices can be individually turned on, with the brightness of each die controlled by a separate current source.

Figure 20:
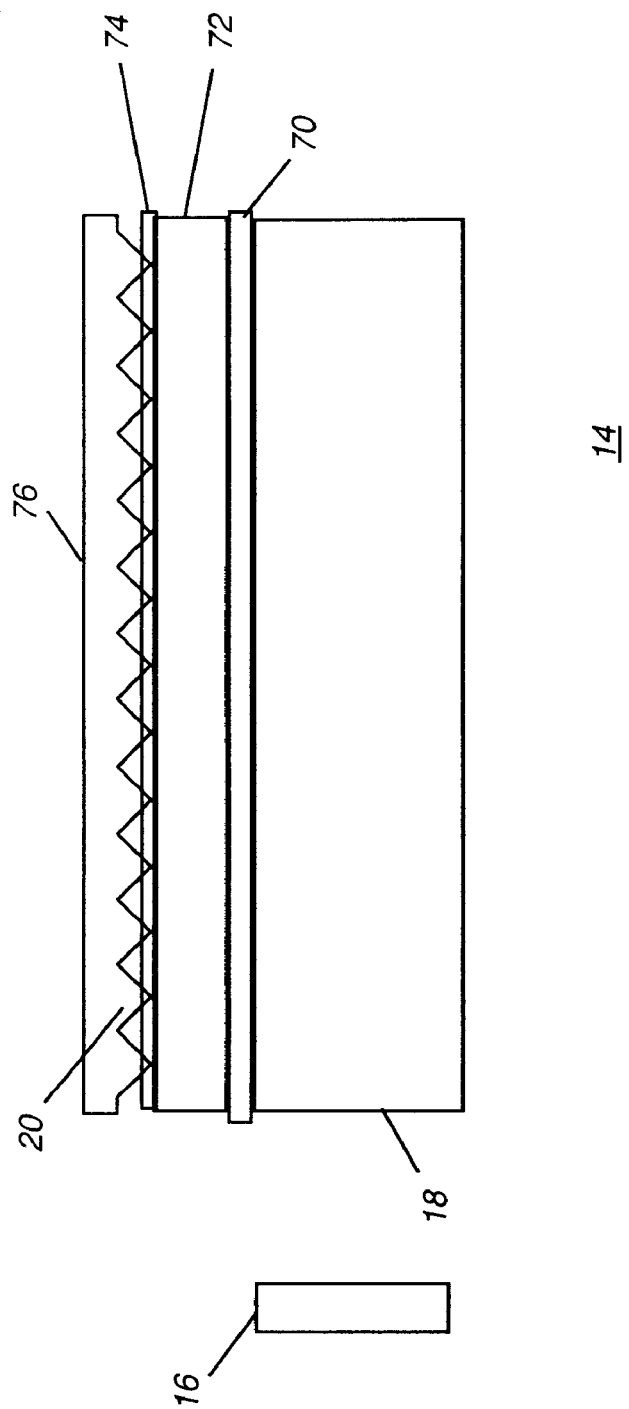
FIG. 20 is a cross-sectional view, taken lengthwise, of a portion of an elongated illuminator in one embodiment.

Another embodiment of an elongated illuminator 14 is shown in lengthwise cross-section in FIG. 20, not to scale. For attachment of a light extraction film 76 as light extraction element 20, a UV adhesive (Norland UV epoxy) 70 was applied to one side of light channel 18 using a micro-tip dispenser. Care was taken to apply only enough monomer so that, when the light extraction film structure was applied, it provided uniform wetting of the surface to adhere the light extraction film assembly to light channel 18. The light extraction film assemblage was laminated to light channel 18 and then exposed to a UV source to cross link the adhesive. The light extraction film structure was made with a micro-structured inverted prism film having individual prism elements, in a distribution with fewer micro-structured inverted prisms toward the end than in the center. The inverted prisms were partially buried into a polyurethane adhesive 74 that was approximately 8 microns thick. The adhesive had been previously been coated onto a 5 mils polyester sheet 72 and heat laminated at 230 degrees F. in order to adhere the prism sheet to one side of adhesive coated polyester sheet 72. The prisms were embedded to approximately 10 microns due to the displacement of the heat during lamination.

A collimating linear Fresnel film with a focal length of approximately 2.5 inches) was placed over top of light channel 18 with an air gap approximately equal to the focal length of the film. A series of photos demonstrated high brightness with good spatial uniformity. LEDs were lit individually to produce R, G, B illumination and then mixed together to form a well-mixed white LED light.

Incorporated herein by reference are U.S. Pat. No. 6,425,675; and U.S. Patent Application Nos. 2004/0223691 and US 2004/0179776.

Example

The color uniformity of a light pipe configured as light channel 18 according to the present invention was compared to the color uniformity of a light guide plate (LGP) for similar solid-state light sources. The light pipe was formed from PMMA and had a 6 mm square cross section and 245 mm length. A light extraction film was adhered to the top side of the light pipe. The light extraction film had prismatic features partly embedded into a layer of optical clear adhesive that forms regions of polymer next to regions of air. The adhesive (approximately 10 microns thick) was coated onto a sheet of polyester film. The polyester film was then adhered to the top side of the light pipe using an optically clear adhesive.

An array of LEDs was position on each end of the light pipe. The output light was measured as it exited the light extraction film. A point approximately midway between the LEDs and near the widthwise center of the light pipe (approximately 3 mm from an edge of the light pipe) was measured as Sample 1. A second point near the edge was selected as Sample 2 and compared in color uniformity to the center point.

For comparison, a light guide plate of the same material, thickness and length was selected. The width of the LGP was several times wider than the light pipe. The same type of light extraction film was applied to the LGP in a similar manner as described for the light pipe. The LGP used the same LED light sources on each end. A point midway between the LEDs was selected as Sample 11. A comparative point within a couple of mm of Sample 11 was also measured and compared as Sample 12.

The color shift of light pipe and light guide plate is evaluated using standard CIE 1931 color spaces. For this standard, the tristimulus values of the light are given by the integration across the whole visual spectrum as the following:

$$X = k \int P(\lambda) I(\lambda) \bar{x}(\lambda) d\lambda$$

$$Y = k \int P(\lambda) I(\lambda) \bar{y}(\lambda) d\lambda$$

$$Z = k \int P(\lambda) I(\lambda) \bar{z}(\lambda) d\lambda,$$

$$k = \frac{100}{\sum I(\lambda) \bar{y}(\lambda) \Delta\lambda}$$

where the $\bar{x}$, $\bar{y}$, and $\bar{z}$ are matching functions of Red, Green, and Blue color spectra, respectively. k is a constant and $\lambda$ is the wavelength. $P(\lambda)$ is the light spectrum and $I(\lambda)$ is the standard illuminant. Normalizing tristimulus values gives the chromaticity coordinates, which are as follows:

$$x = \frac{X}{X+Y+Z}$$

$$y = \frac{Y}{X+Y+Z}$$

$$z = \frac{Z}{X+Y+Z}$$

$$x + y + z = 1$$

Table 1 lists relevant parameter measurements and results. To compare the color uniformity of the light pipe of light channel 18 vs. the light guide plate (LGP) in tristimulus space, the square root of the sum of the squares of $\Delta x$ and $\Delta x$ value for the light pipe (Sample 2 vs Sample 1) is compared to the same value for the LGP (Sample 12 vs. Sample 11). The results are shown in the $\Delta$Color row of Table 1 The lower $\Delta$Color value for the light pipe indicate a more uniform color. Here, the light pipe showed to be approximately 20 times more uniform than the LGP. The use of the light pipe thus provides improved color mixing over than of the LGP.

TABLE 1

| | Light pipe | | Light guide plate | |
| --- | --- | --- | --- | --- |
| | Sample 1 (Center) | Sample 2 (Comparison) | Sample 11 (Center) | Sample 12 (Comparison) |
| x | 0.27693 | 0.27726 | 0.26790 | 0.27131 |
| y | 0.28573 | 0.28818 | 0.28158 | 0.29186 |
| $\Delta$x | | −0.00562 | | 0.17284 |
| $\Delta$y | | 0.00613 | | −0.01027 |
| $\Delta$Color | | 0.00831 | | 0.01731 |

Notes to Table 1:
$\Delta x = x_{Sample\ 2} - x_{Sample\ 1}$,
$\Delta y = y_{Sample\ 2} - y_{Sample\ 1}$,
$\Delta$Color = Square Root($\Delta x^2 + \Delta y^2$)

The apparatus of the present invention provides a high degree of light extraction, directing at least 50% of the LED light outwards toward display panel 24. Advantaged over earlier backlighting approaches, the apparatus of the present invention provides improved color mixing. Using Red, Green, and Blue LEDs, high spatial uniformity of color can be achieved over the visible range. For specialized applications, wavelengths longer or shorter than the visible range could be used. Brightness uniformity of better than 80% can be provided. Advantageously, backlight apparatus 10 of the present invention can provide sufficient brightness so that it eliminates the need for a light guide plate and minimizes the need for supporting films for light enhancement and polarization. Backlight apparatus 10 formed from multiple elongated illuminators 14 is easily scalable, making this solution particularly suitable for display panels of larger dimensions. A larger display panel can be supported simply by using additional elongated illuminators 14. At the same time, due to its low dimensional profile, this solution can help to reduce overall thickness of the display device.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the method of the present invention could be used with any of a number of types or colors of light sources. Any of a number of light conditioning elements could be provided as part of backlight apparatus 10, including components used for light shaping, light collimating, light spreading, light polarization, and light recycling, for example.

While the specification concludes with claims particularly pointing out and distinctly claiming the subject matter of the present invention, it is believed that the invention will be better understood from the following description when taken in conjunction with the accompanying drawings, wherein: The patents and other publications referred to in this description are incorporated herein by reference in their entirety.

PARTS LIST

10. Backlight apparatus
12. Light pipe array
14. Elongated illuminator
16, 16r, 16g, 16b. Light source; light source, red; light source, green; light source, blue
18. Light channel
20. Light extraction element
22. Illumination plane
24. Display panel
28. Light directing structure
30. Reflective surface
32. Air gap
34. Diffuser
36. Collimator
38. Light box
39. Reflective surface
40. Display apparatus
42. Light management film
44. Lamp
46. Aperture
48. Reflective surface
50. Light source
52. Support
54. End
56, 58. Dichroic filter
60. Mirror
62. Sensor
64. Beam splitter
66. Reflective surface
70. Adhesive
72. Polyester sheet
74. Adhesive
76. Light extraction film
E. Emitted light
L. Length
T. Thickness
W. Width
x, y, z, z', z'', z'''. Axes

The invention claimed is:

1. A backlight apparatus for directing light toward a display panel, comprising:
   a) two or more elongated illuminators, wherein at least one elongated illuminator is disposed to direct light towards the display panel, wherein the elongated illuminator is in a first plane that is parallel to a second plane of the display panel and the light travels in a direction perpendicular to the planes, and comprises:
      (i) a solid transparent elongated light channel, extended along an illumination plane that is substantially parallel to the display panel and directly below the display panel;
      (ii) an associated solid state light source for providing light to the elongated light channel;
      (iii) a light extraction element for redirecting light upwards from the light channel towards the display panel; and
   b) a light diffusing element for uniformizing the light redirected from the two or more elongated illuminators to provide backlight illumination.

2. The backlight apparatus of claim 1 wherein the at least one solid-state light source is taken from the group consisting of LEDs, OLEDs, PLED; and lasers.

3. The backlight apparatus of claim 1 wherein the light extraction element is a film.

4. The backlight apparatus of claim 1 wherein the light extraction element is formed on the surface of the elongated light channel.

5. The backlight apparatus of claim 1 further comprising a collimator disposed between the two or more elongated illuminators and the light diffusing element.

6. The backlight apparatus of claim 5 wherein the collimator is a cylindrical Fresnel lens.

7. The backlight apparatus of claim 5 wherein the collimator is selected from the group consisting of a cylindrical lens array, a holographic structure, a TIR lens array, and a prism array.

8. The backlight apparatus of claim 1 further comprising a caved reflective surface for directing light from the solid-state light source.

9. The backlight apparatus of claim 1 wherein the light extraction element comprises reflective dots.

10. The backlight apparatus of claim 1 wherein the elongated light channel is tapered.

11. The backlight apparatus of claim 1 further comprising a reflective surface on one end of the elongated light channel.

12. The backlight apparatus of claim 1 wherein at least one elongated illuminator extends substantially the full width or length of the illumination plane.

13. The backlight apparatus of claim 1 wherein at least one elongated illuminator has a curved portion.

14. The backlight apparatus of claim 1 further comprising a light sensor coupled to the elongated light channel.

15. The backlight apparatus of claim 1 further comprising a reflective surface extending along at least a portion of the elongated light channel.

16. The backlight apparatus of claim 1 wherein at least one elongated illuminator has a plurality of solid state light sources.

17. The backlight apparatus of claim 1 further comprising a reflective surface spaced apart from the two or more elongated illuminators for reflecting light toward the display panel.

18. The backlight apparatus of claim 1 wherein, for at least one of the elongated illuminators, there is at least one solid state light source at each end of the elongated light channel.

19. The backlight apparatus of claim 1 wherein the light extraction element comprises microstructures varying in distribution density along the length of the elongated light channel.

20. The backlight apparatus of claim 1 wherein the elongated light channel is square, rectangular, or circular in cross-section.

21. The backlight apparatus of claim 1 further comprising one or more beam splitters for directing light from the at least one solid-state source into the elongated light channel.

22. The backlight apparatus of claim 1 further comprising one or more lamp light sources.

23. The backlight apparatus of claim 1 wherein the length of the elongated light channel exceeds the cross-sectional width by more than 10:1.

24. A display apparatus comprising:
  a) a liquid crystal display panel;
  b) a backlight apparatus for providing backlight illumination towards the liquid crystal display panel, the backlight apparatus comprising a plurality of elongated illuminators, wherein the elongated illuminator is in a first plane that is parallel to a second plane of the display panel and the backlight travels in a direction perpendicular to the planes, wherein at least one elongated illuminator comprises:
    (i) a solid transparent elongated light channel, extended along an illumination plane that is substantially parallel to the display panel and located below the display panel;
    (ii) at least one independent solid state light source for directing light to the elongated light channel; and
    (iii) a light extraction element for redirecting light upwards from the light channel and towards the display panel.

25. The display apparatus of claim 24 further comprising a light conditioning element providing at least one function selected from the group consisting of light shaping, light collimating, light spreading, light polarization, and light recycling.

26. The display apparatus of claim 25 wherein said light conditioning element comprises one or more of a roughened surface, beads, or microstructures.

27. A backlight apparatus for directing light toward a display panel, comprising:
  a) two or more elongated illuminators, wherein at least one elongated illuminator directs light towards the display panel, wherein the elongated illuminator is in a first plane that is parallel to a second plane of the display panel and the light travels in a direction perpendicular to the planes, and comprises:
    (i) an elongated light channel, extended along an illumination plane that is substantially parallel to the display panel;
    (ii) at least one solid state light source for providing light to the elongated light channel, wherein the solid state light source provides a plurality of different colors of light;
    (iii) a light extraction element for redirecting light outwards from the light channel towards the display panel; and
  b) a light diffusing element for uniformizing the light redirected from the two or more elongated illuminators to provide backlight illumination.

28. The backlight apparatus of claim 27 wherein the solid state light source provides red, green, and blue light.

29. The backlight apparatus of claim 27 further comprising a light conditioning element providing at least one function taken from the group consisting of light shaping, light collimating, light spreading, light polarization, and light recycling.

30. The display apparatus of claim 27 wherein said light conditioning element comprises one or more of a roughened surface, beads, or microstructures.

31. A backlight apparatus for directing light toward a display panel, comprising:
  a) a solid state light source;
  b) two or more are elongated illuminators, wherein at least one elongated illuminator directs light from the at least one solid state light source towards the display panel, wherein the elongated illuminator is in a first plane that is parallel to a second plane of the display panel and the light travels in a direction perpendicular to the planes, and comprises:
    (i) an elongated light channel extended along an illumination plane that is substantially parallel to the display panel;
    (ii) a reflective surface for directing a portion of the light from the solid state light source into the elongated light channel;
    (iii) a light extraction element for redirecting light outwards from the light channel towards the display panel; and
  c) a light diffusing element for uniformizing the light redirected from the two or more elongated illuminators to provide backlight illumination.

32. The backlight apparatus of claim 31 wherein the reflective surface is a dichroic surface.

33. The backlight apparatus of claim 31 further comprising a light conditioning element providing at least one function taken from the group consisting of light shaping, light collimating, light spreading, light polarization, and light recycling.

34. The display apparatus of claim 31 wherein said light conditioning element comprises one or more of a roughened surface, beads, or microstructures.

35. A backlight apparatus for directing light toward a display panel, comprising:
  a) a reflective surface;
  b) two or more elongated illuminators, wherein at least one elongated illuminator is suspended above the reflective surface and directs light towards the display panel, wherein the elongated illuminator is in a first plane that is parallel to a second plane of the display panel and the light travels in a direction perpendicular to the planes, and comprises:
    (i) a elongated light channel, extended along an illumination plane that is substantially parallel to the display panel;
    (ii) at least one solid state light source for providing light to the elongated light channel;
    (iii) a light extraction element for redirecting light outwards from the light channel towards the display panel; and
  c) a light diffusing element for uniformizing the light redirected from the two or more elongated illuminators to provide backlight illumination.

36. A process for providing uniform light comprising using the apparatus of claim 1 to generate the light.

* * * * *